United States Patent [19]

Harris

[11] Patent Number: 4,553,247

[45] Date of Patent: Nov. 12, 1985

[54] TELEMETRY SYSTEM WITH SIGNAL BOOSTER FOR DIGITAL DATA TRANSMISSION THROUGH A TRANSMISSION LINE

[75] Inventor: Robert W. Harris, Crofton, Md.

[73] Assignee: Gould Inc., Rolling Meadows, Ill.

[21] Appl. No.: 574,698

[22] Filed: Jan. 27, 1984

Related U.S. Application Data

[60] Division of Ser. No. 323,599, Nov. 20, 1981, Pat. No. 4,468,785, which is a continuation-in-part of Ser. No. 272,125, Jun. 10, 1981, abandoned.

[51] Int. Cl.$^4$ ............................................. H04J 3/08
[52] U.S. Cl. .......................................... 375/4; 375/36; 178/70 R; 340/870.13; 370/97
[58] Field of Search ................... 375/3, 4, 36, 107, 111, 375/112; 340/825.01, 825.02, 858, 870.13, 870.14; 370/85, 97; 178/70 R; 330/61 A, 69, 151; 363/13, 19

[56] References Cited

U.S. PATENT DOCUMENTS

| | | | |
|---|---|---|---|
| 2,360,932 | 10/1944 | Bullington | 178/45 |
| 2,585,571 | 2/1952 | Mohr | 375/3 |
| 2,797,340 | 6/1957 | Bennett | 370/97 |
| 3,707,700 | 12/1972 | Lafont | 340/858 |
| 3,911,226 | 10/1975 | Angelle et al. | 370/85 |
| 3,980,966 | 9/1976 | Gieck | 330/69 |
| 3,985,970 | 10/1976 | Lerault et al. | 375/4 |
| 4,139,737 | 2/1979 | Shimada et al. | 340/870.13 |
| 4,319,093 | 3/1982 | Bars | 179/170 D |
| 4,330,859 | 5/1982 | Takada | 370/97 |

OTHER PUBLICATIONS

Bell System Technical Journal, "The Use of Negative-Impedance Units Inserted Uniformly Into a Transmission Line to Reduce Attenuation", vol. 53, No. 9, Nov. 1974, pp. 1845-1893—Manley.

Bell System Technical Journal, "Negative Impedance Boosting", Jul.-Aug. 1968, pp. 1019-1041—Meacham.
IEEE Transactions on Communications, "Broad-Band Coaxial Boosted Media Employing Negative-Impedance Junctions and Amplifiers", vol. Com-26, pp. 1470-1472, Oct. 1978—Fukunaga et al.
Int. J. Electronics, "Two-Terminal Current-Fed Negative Admittance Incorporating Field Effect Transistors", 35, pp. 401-412, Sep. 1973—Stanley et al.

Primary Examiner—Robert L. Griffin
Assistant Examiner—Raymond C. Glenny

[57] ABSTRACT

A telemetry system for sensing remote physical events and for transmitting and boosting a digital data signal representing the sensed events on a transmission line, which comprises a master clock and a plurality of sensing stations for sensing local data. The sensing stations inject local data onto the transmission line as a digital data signal, and a controller/receiver receives the digital data. The master clock initializes the system timing and generates a sync signal. Each sensing station includes a booster subsystem for receiving the local digital data and for injecting the digital data onto the transmission line as a digital data signal. During system start up, each booster subsystem claims a slot, in accordance with an organizational process, for injecting the digital data signal onto the transmission line. The booster subsystem in each sensing station further includes a booster circuit for boosting the digital data signals which are propagating on the transmission line, as well as the sync signal. The booster circuit comprises a negative impedance bistable device for enhancing the amplitude and rise time of the digital data signal. Each booster subsystem further includes a switching mode regulator circuit for converting a supply current on the transmission line to a level voltage, thereby providing local power to the components of the sensing station.

19 Claims, 25 Drawing Figures

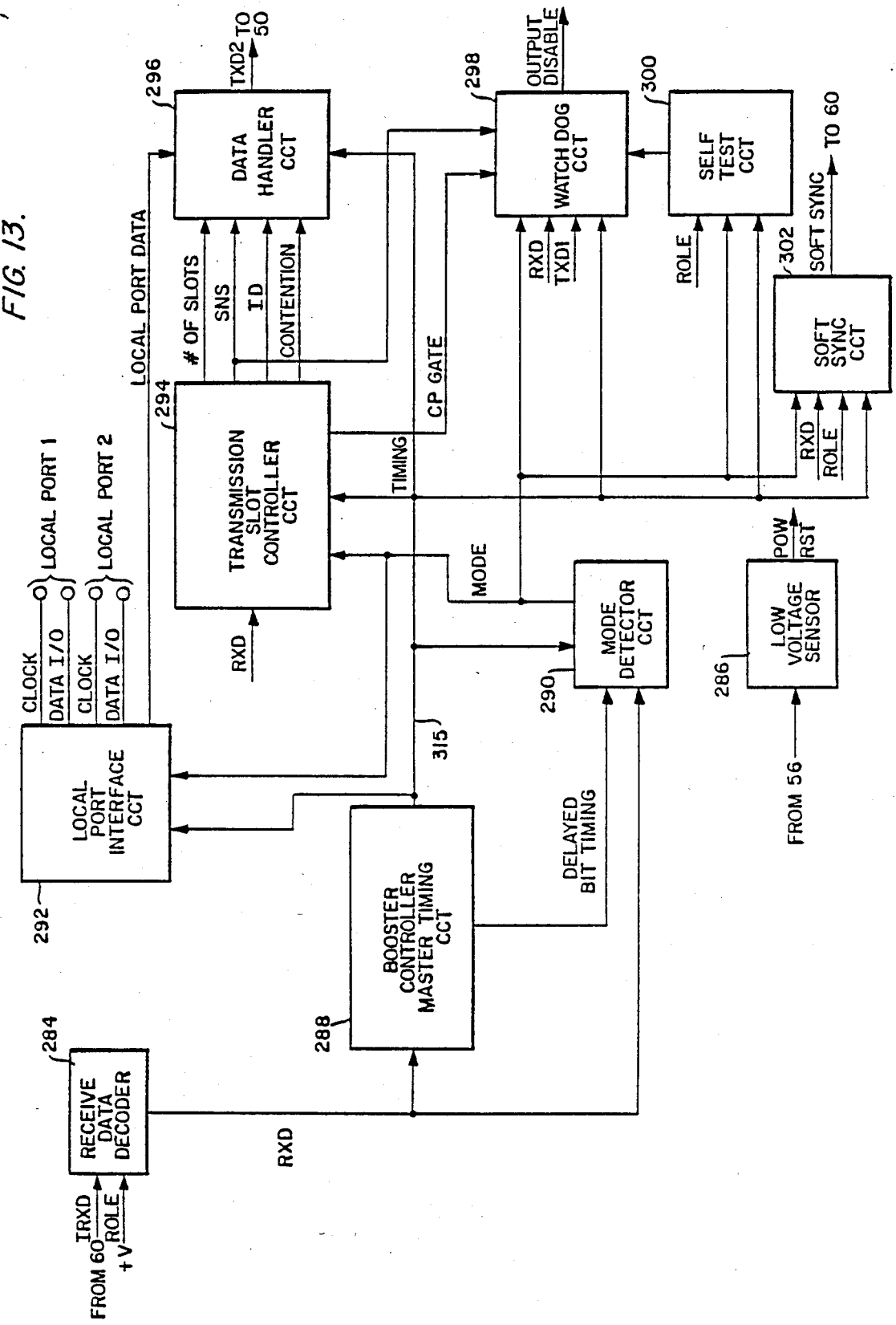

NOTE: ALL TRANSITIONS OCCUR AT SLOT BOUNDARIES

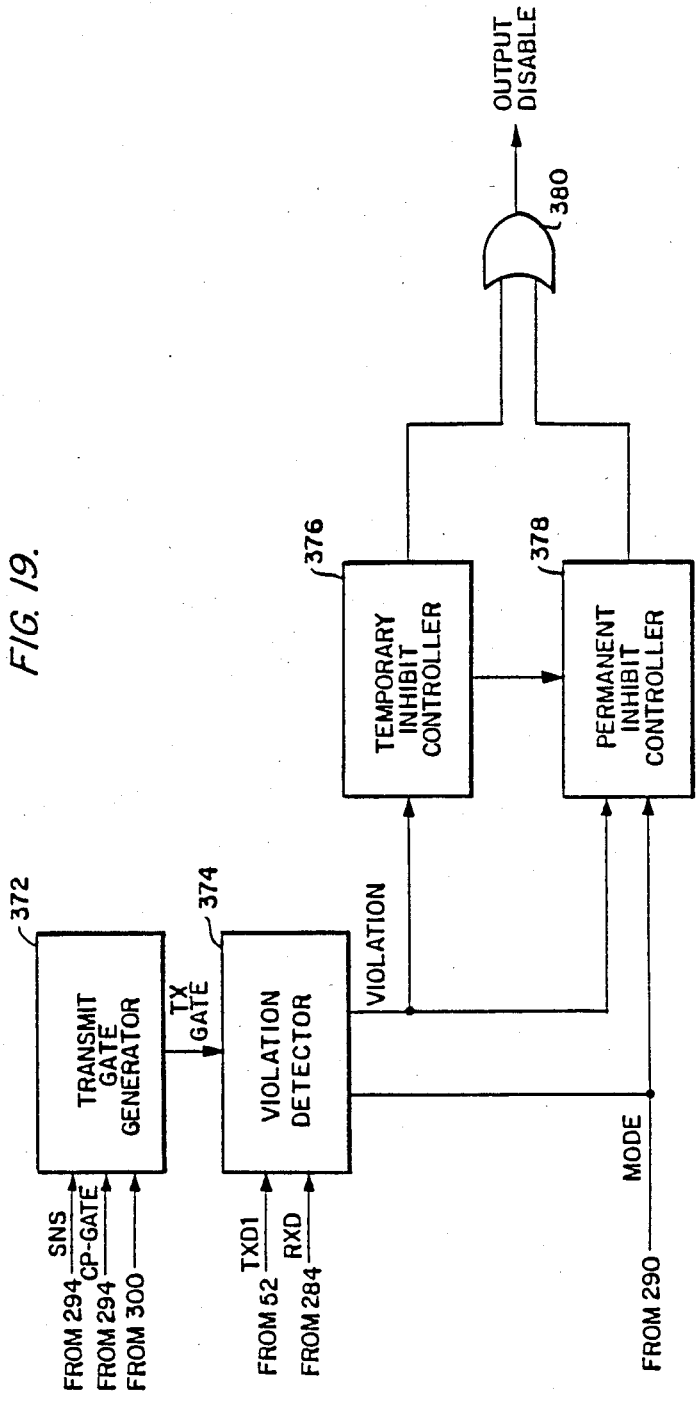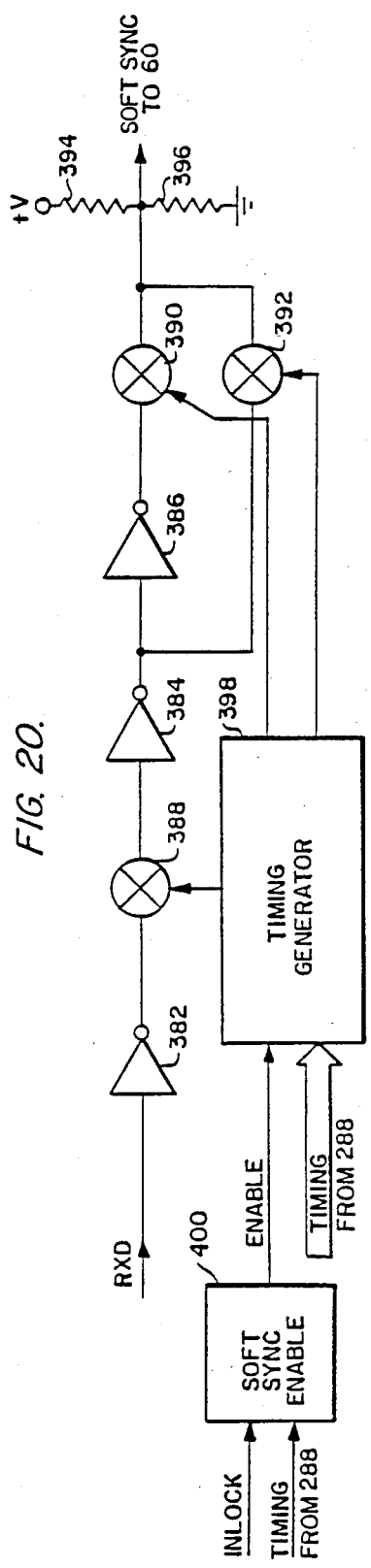

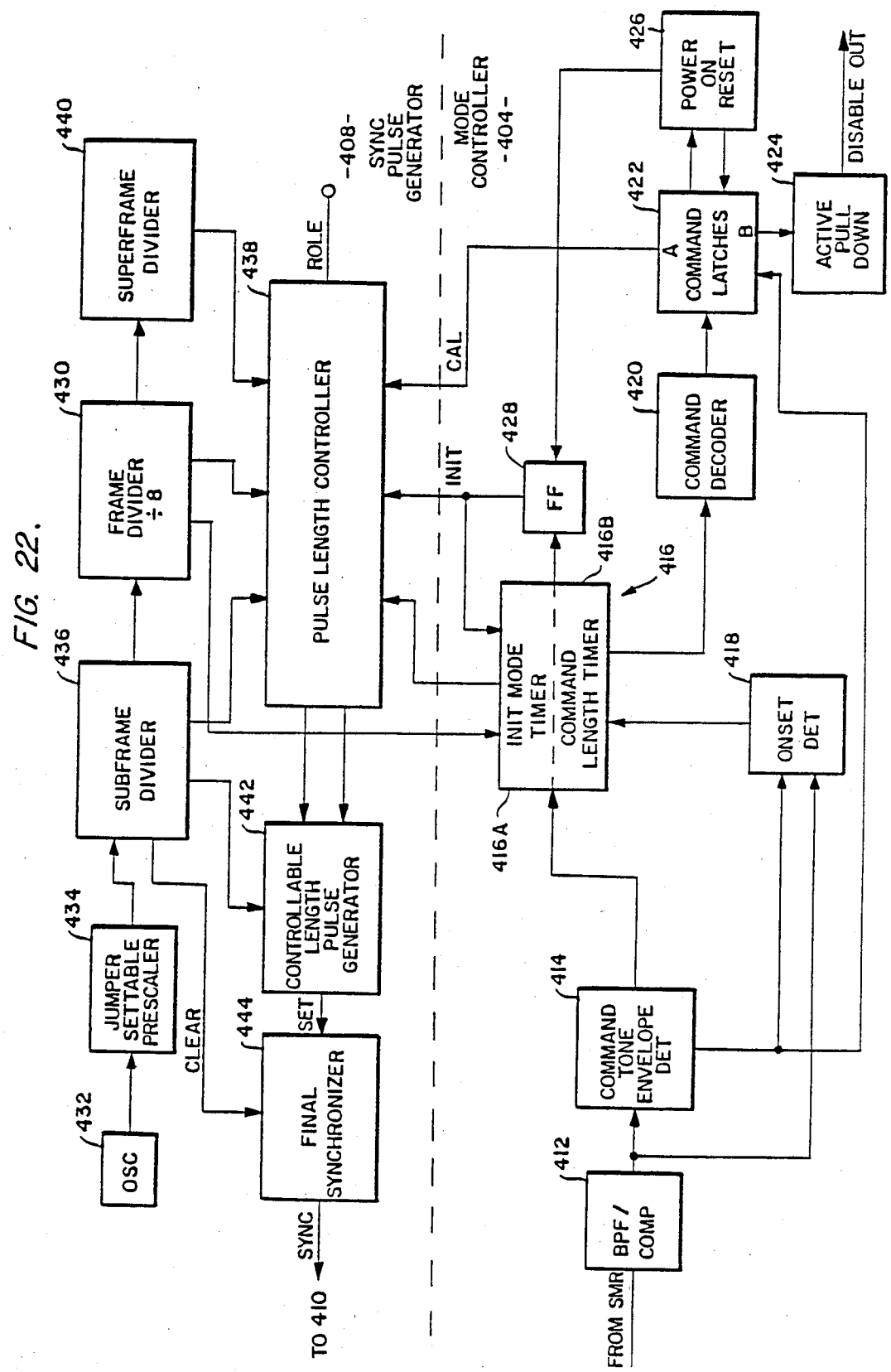

TELEMETRY SYSTEM WITH SIGNAL BOOSTER FOR DIGITAL DATA TRANSMISSION THROUGH A TRANSMISSION LINE

CROSS REFERENCE TO RELATED APPLICATION

This is a division of application Ser. No. 323,599, filed Nov. 20, 1981, now U.S. Pat. No. 4,468,785, which was a continuation-in-part of my U.S. application Ser. No. 272,125, filed June 10, 1981, now abandoned, entitled BOOSTER FOR DIGITAL DATA TRANSMISSION THROUGH ELECTRONIC TRANSMISSION LINES.

BACKGROUND OF THE INVENTION

This invention relates to a system for sensing remote events and for transmitting and boosting a digital data signal representing the sensed events on a transmission line.

In the field of telemetry, there are a number of systems which employ a variety of sensors for sensing physical events (e.g., sound, light, movement, temperature, stress, etc.) and for transmitting sensor signals over electronic transmission lines to a central receiving station. One example of such a telemetry system is a towed sonar array system which comprises a plurality of hydrophones connected to a transmission line (e.g., a coaxial cable) which is in turn connected to a central data receiving station. The towed array is placed in water and is towed by a vessel (e.g., a submarine) for detection purposes. Each of the sensors is capable of generating an analog sensing signal which is converted into a digital data signal by an A/D converter. The digital data signal is injected onto the transmission line for transmission to the central data receiving station.

Due to the limited data transmission capacity of metallic transmission cables, there has been a need in the art for circuitry which is capable of compensating for the propagation losses of the digital data signal transmitted on the transmission lines. Such circuits have, in general, consisted of repeater circuits and/or resynchronizers which are placed at predetermined intervals along the transmission line in order to amplify the signal. However, because of the serial nature of these repeater circuits, sensor array systems employing these repeater systems are unreliable. That is, if one repeater in the array fails, data transmission is seriously attenuated or ceases altogether. In addition, the prior art repeater systems are relatively heavy, making them less desirable for use in the seawater environment of the towed sonar array. Thus, there is a need in the art for a telemetry system including a circuit for boosting a digital data signal, which is both light in weight and which does not have a seriality problem, so that if one of the booster circuits fails, the remaining booster circuits are capable of amplifying the digital data signals to compensate for any propagation losses.

SUMMARY OF THE INVENTION

An object of the present invention is to provide a telemetry system including a circuit for boosting digital data signals transmitted on a transmission line, which overcomes the deficiencies of prior art repeater systems.

In particular, it is an object of the present invention to provide a booster circuit for enhancing the edges of a digital data waveform by preserving their amplitude, sharpness and timing in spite of the attenuation caused by the transmission line and the noise which is present on the transmission line.

A further object of this invention is to provide a booster circuit which has no seriality problems, so that a plurality of the booster circuits of the present invention may be coupled at spaced points along the transmission line, wherein if one or several of the plurality of booster circuits fails, the remaining operative booster circuits will compensate for the failed booster circuits.

A still further object of this invention is to provide a booster telemetry system having a plurality of sensing stations, wherein a booster circuit is included in each sensing station and wherein each sensing station is capable of determining when to boost an incoming digital data signal on the transmission line and when to inject a local digital data signal onto the transmission line.

It is a still further object of this invention to provide a booster telemetry system having a plurality of sensing stations, wherein the transmission time for each of the sensing stations to inject a local digital data signal onto the transmission line is determined when the system is initially turned on, so that the sensing stations are interchangeable and need not be preset with a pre-reserved time slot for injection of local digital data onto the transmission line.

A still further object of this invention is to provide a booster telemetry system having a plurality of sensing stations, each of which includes a means for receiving power from the transmission line and for providing local power for operating each of the components of the sensing station, without having power supply faults (i.e., short circuits open circuits, etc.) in any one sensing station interfere with power distribution to the other sensing stations.

The booster telemetry system of the present invention has a number of novel features as set forth below. The booster telemetry system includes a master clock and a plurality of sensing stations coupled to an electronic transmission line. A system power and control subsystem including a controller/receiver for receiving sensed local data and for controlling the operation of the master clock and the sensing stations, is also connected to the electronic transmission line. When the booster telemetry system is powered up, each of the sensing stations claims a time slot for transmission of local sensed data in accordance with an organizational process initiated by the controller/receiver and the master clock. Thus, the booster telemetry system ensures that a sensing station cannot inject its sensed digital data signal on top of a digital data signal which has been transmitted by another sensing station. As noted above, each of the sensing stations includes a booster circuit for boosting the digital data signals injected onto the transmission line by prior sensing stations. The booster circuit comprises a negative impedance bistable device connected to the transmission line. The negative impedance bistable device is an edge sensitive device which detects the edges of a digital data waveform and injects a fixed amplitude signal onto the transmission line to preserve the amplitude, and timing of the edges of the digital data waveform. In addition, the negative impedance bistable device is weakly coupled to the transmission line, so that if the negative impedance bistable device fails, it does not attenuate the digital data signal to any great extent. Thus, the booster circuit of the present invention provides significant advantages as a booster for boosting digital data signals transmitted on a transmission line. As further noted above, each sensing station in the booster telemetry system of the present invention includes a switching mode regulator circuit for receiving a power signal which is present on the transmission line. The switching mode regulator circuit provides power to each of the circuits present in the sensing station, so that there is no need for a separate power source in each of the sensing stations.

These together with other objects and advantages, which will become subsequently apparent, reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

FIG. 13 is a block diagram of the booster controller circuit 52 of FIG. 2;

FIG. 19 is a block diagram of the watchdog circuit 298 of FIG. 13;

FIG. 20 is a block diagram of the soft sync circuit 302 of FIG. 13;

FIG. 22 is a block diagram of the sync pulse generator 408 and the mode controller 404 of FIG. 21.

DETAILED DESCRIPTION OF THE PREFERRED EMBODIMENTS

Figure 1:
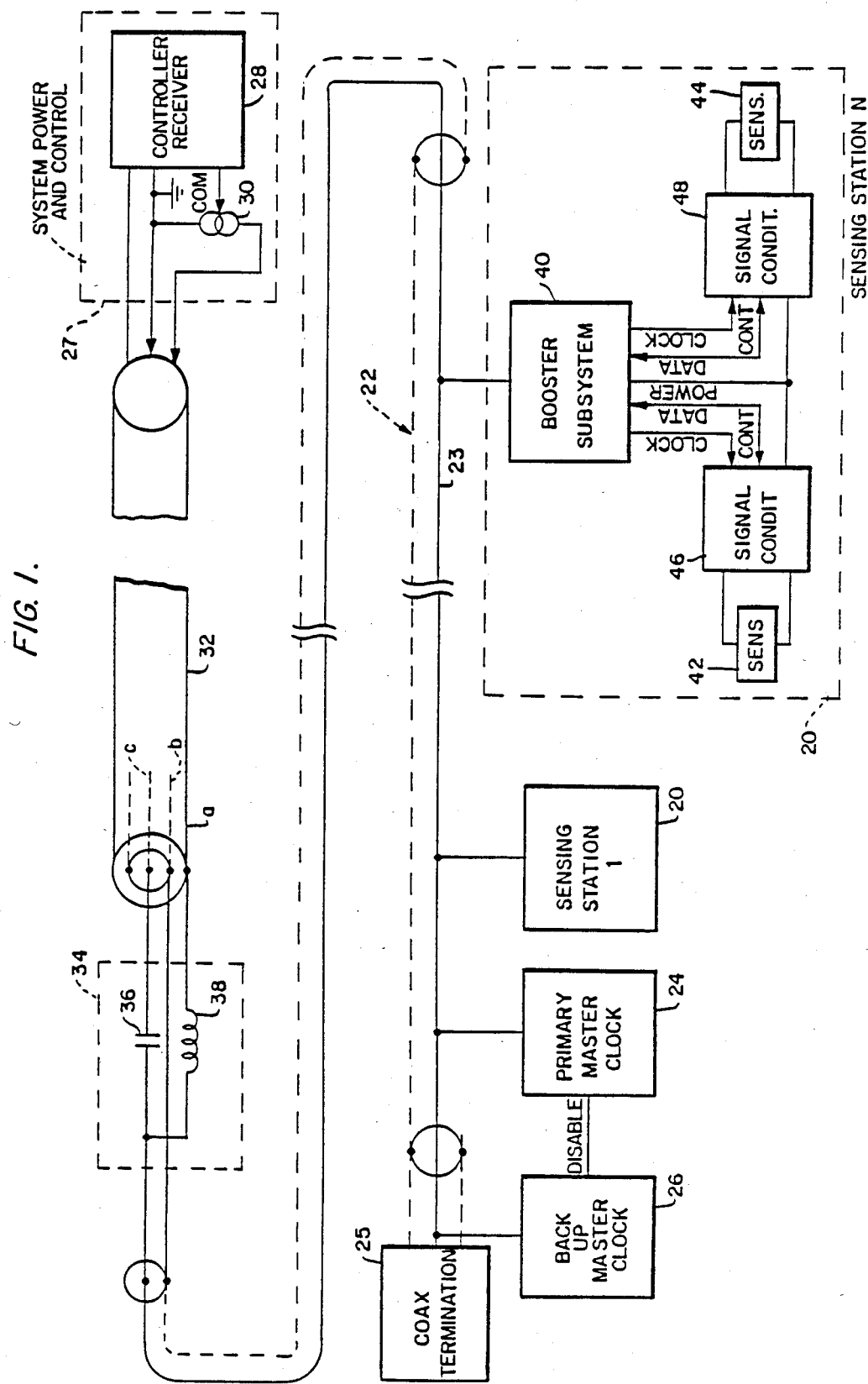
FIG. 1 is a block diagram of the booster telemetry system of the present invention.

FIG. 1 is a block diagram of the booster telemetry system of the present invention. It is a high-speed time-division-multiplexed system having a data handling capability of up to 20 megabits/second. The booster telemetry system of the present invention has applications both in military and commercial systems where a large number of sensors must be monitored. For example, the booster telemetry system can be used for land and sea oil exploration and in the commercial process industry. In the preferred embodiment, the telemetry system is employed as a towed sonar array system. However, the booster telemetry system of the present invention is suitable for use in any digital data transmission system having plural sensors.

Referring to FIG. 1, sensing stations 20 are connected to an electronic transmission line 22 which in the preferred embodiment is a single coaxial cable having a center conductor 23. The number and location of the sensing stations 20 connected to the transmission line 22 is a function of the type of physical event which is to be sensed. A primary master clock 24 and a backup master clock 26, for synchronizing the operation of the sensing stations 20, are connected at one end of the transmission line 22 adjacent a coax termination 25. A system power and control subsystem 27 includes a controller/receiver 28 which is a central processing system for generating command signals for controlling the operation of the booster telemetry system and is adapted to receive digital data. For example, the controller/receiver 28 may include a shipboard computer which is connected to a towed array. The system power and control subsystem 27 further includes a constant current power supply 30 which provides power and command tones on conductors a and b of a triaxial tow cable 32. The controller/receiver 28 provides a command signal to the constant current power supply 30 to modulate the constant current, thereby generating the command tones. The tow cable 32 is required in a towed array in order to position the array of sensing stations 20 at a predetermined distance away from the vessel which is towing the array. A signal-power splitter 34 connects the triaxial tow cable 32 to the two-conductor transmission line 22, so that the power signal, the digital data signals from the sensing stations 20 and the command signals from the controller/receiver 28 are all conducted on the transmission line 22. However, the digital data signals are transmitted to the controller/receiver 28 on conductors b and c of the triaxial tow cable 32. Thus, the signal power splitter 34 splits the digital data from the power. In the preferred embodiment, the signal-power splitter 34 comprises a capacitor 36 and an inductor 38.

Each sensing station 20 comprises a booster subsystem 40, sensors 42 and 44 and signal conditioning circuits 46 and 48. The sensors 42 and 44 are used to sense some physical event (e.g., sound, light, movement, temperature, stress, etc.). In the preferred embodiment, the sensors 42 and 44 are hydrophones which are used in a towed array. The sensors 42 and 44 provide analog data to the signal conditioning circuits 46 and 48, respectively. The signal conditioning circuits 46 and 48 amplify and filter the analog data and convert the analog data to digital data. The booster subsystem 40 acts as an interface between the transmission line 22 and a pair of channels comprising (1) the sensor 42 and the signal conditioning circuit 46 and (2) the sensor 44 and the signal conditioning circuit 48. The booster subsystem 40 distributes power to operate the channels and receives the digital data from the signal conditioning circuits 46 and 48. The booster subsystem 40 also passes timing and control signals (e.g., for calibrating the sensors 42 and 44) to the channels. The booster subsystem 40 is capable of receiving any type of digital data, so that the booster subsystem 40 could be connected to any type of sensing circuitry which generates a digital data signal.

Whenever the booster subsystem 40 sends a control pulse CONT to the signal conditioning circuit 46 on the DATA/CONT line, the signal conditioning circuit 46 provides 8-bit data, synchronized to the clock signal, to the booster subsystem 40.

As noted above, the primary master clock 24 and the backup master clock 26 are connected to the transmission line 22 at the end of the array of sensing stations 20. The primary master clock 24 and the backup master clock 26 have the same internal design and are connected to each other and to the transmission line 22 in a slightly different manner so that one assumes the role of the backup master clock 26 and the other assumes the role of the primary master clock 24. When the sensor array is initially turned on, the primary master clock 24 begins functioning and the backup master clock 26 is inactive. The system power and control subsystem 27 is capable of sending a command tone which is sensed by the primary master clock 24 and the backup master clock 26. If the command tone is a short tone burst, the primary master clock 24 will alter the length of one of the sync pulses (sync pulse 2) to indicate a transition to or from a calibration mode to the sensing stations 20. If the command tone is a long tone burst then the backup master clock 26 is turned on. Another long tone burst will turn the backup master clock 26 off. Thus, every time a long tone burst is transmitted by the system power and control subsystem 27 the state of the backup master clock 26 is changed. When the backup master clock 26 is activated, it sends a disable signal to the primary master clock 24 to turn the primary master clock 24 off. Thus, the long command tone burst alternately enables the backup master clock 26 and the primary master clock 24. Since the primary master clock 24 and the backup master clock 26 function in the same manner, only the function of the primary master clock 24 will be discussed below. The primary master clock 24 transmits a synchronization signal (hereinafter referred to as a sync signal) including plural sync pulses on the transmission line 22 and these sync pulses are received by the booster subsystem 40 in each of the sensing stations 20. The sync pulses which are evenly spaced with reference to their trailing edges, are used to organize the system timing so that the sensing stations 20 will inject digital data onto the transmission line 22 in discrete time slots.

Figure 14:
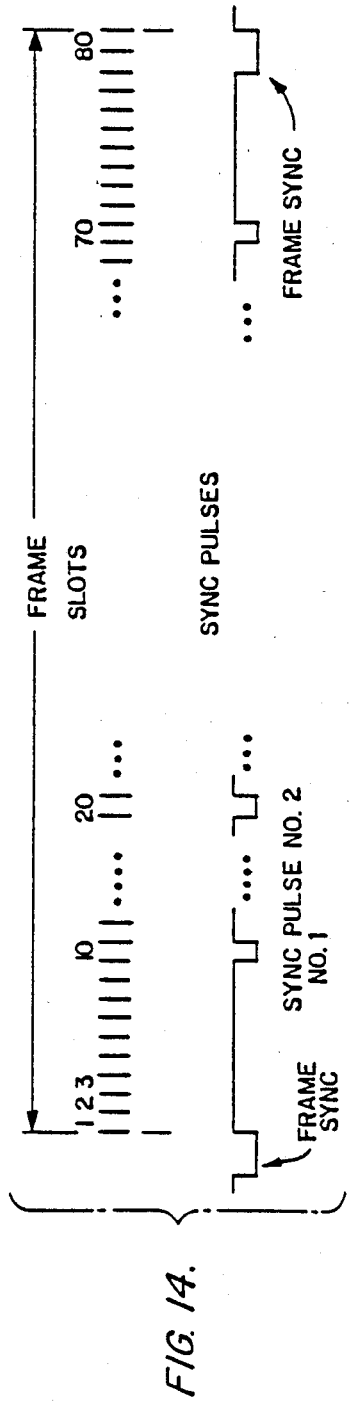
FIG. 14 is a timing diagram illustrating the sync pulses used in the organizational procedure for assigning a time slot to each sensing station, wherein each sensing station will inject a digital data signal onto the transmission line in its assigned time slot.

The process of organizing the timing for the injection of digital data onto the transmission line by the sensing stations 20 is best illustrated with reference to FIG. 14 of the drawings. The sync pulses are generated such that eight pulses define a frame. The frame is broken down into a number of time slots which is at least as great as the number of sensing stations 20 connected to the transmission line 22. The sync pulses are spaced equidistantly in the frame and, in general, each sync pulse is one time slot in width. However, for example, the eighth sync pulse is designated a frame sync pulse (to denote the frame length) and is approximately two time slots long. Further, the pulse width of the first seven sync pulses may be altered to convey, for example, changes in mode (e.g., data mode, calibration, contention mode, etc.) to the sensing stations 20 and to convey information on system operation to the system power and control subsystem 27. The length of the first sync pulse (sync pulse No. 1) is modulated to indicate whether the system is in an idle mode or a data mode. The length of the second sync pulse (sync pulse No. 2) is modulated to control calibration of the sensors 42 and 44. The trailing edges of the eight sync pulses generated during a frame are used to maintain fine synchronization of the system.

As mentioned above, the number of time slots in a frame must be at least as great as the number of sensing stations 20, and each sensing station 20 is assigned a particular time slot for transmitting a digital data signal onto the transmission line 22. The assignment of a particular time slot to a particular sensing station 20 is a function of the relative position of the sensing station 20 along the transmission line 22 with respect to the other sensing stations 20. When the system is turned on, the sensing stations 20 are not sending any data and the system operates for approximately 2000 frames to allow for timing acquisition. Then, the length of sync pulse 1 is modulated from long (indicating idle mode) to short to indicate that normal operation is about to start and that the organizational or contention frame is approaching. In the preferred embodiment there are actually two contention frames. The nominal performance of both contention frames is the same. The first contention frame is employed to check for malfunctions in the sensing stations 20 and to disable malfunctioning sensing stations. Hereinafter, reference to "the contention frame" is to the second contention frame during which time slots are claimed by the sensing stations 20. When the next frame sync pulse is received by the sensing stations 20, the sensing stations 20 recognize that the contention frame is starting. Each sensing station 20 recognizes the sync pulses from the primary master clock 24 and any pulses which are injected onto the transmission line 22 by a prior sensing station 20. A prior sensing station 20 is defined as a sensing station 20 which is closer to the coax termination 25 (or back end of the array) than the subject sensing station 20 (i.e., the first sensing station 20 is closest to the coax termination 23). For example, if there are N (where N is an integer) sensing stations 20 then the Kth sensing station 20 (where K is an integer less than or equal to N) can recognize signals injected onto the transmission line by the first through $(K-1)$th sensing stations 20. However, the Kth sensing station 20 will not recognize signals injected onto the transmission line 22 by the Lth sensing station 20 (where L is an integer and $K<L<N$). This is due to the directionality of the system.

When the contention frame begins, during the first time slot the booster subsystem 40 in each of the sensing stations 20 transmits a contention pulse on the transmission line 22 to attempt to claim the time slot for data transmission. If the booster subsystem 40 of a particular sensing station 20 recognizes contention pulses sent by other sensing stations 20, then the booster subsystem 40 for that particular sensing station 20 does not claim that time slot for transmission. Thus, the first time slot will be claimed by the first sensing station 20, the second time slot will be claimed by the second sensing station 20, the third time slot will be claimed by the third sensing station 20 and so on. Once the booster subsystem 40 of a particular sensing station 20 has successfully claimed a time slot, it will not transmit any more contention pulses during the contention frame. This allows the booster subsystem 40 of succeeding sensor stations 20 to claim time slots for data transmission in the frame.

As noted above, the number of time slots per frame is at least as great as the number of sensing stations 20 connected to the transmission line 22. In particular, the number of slots is equal to 16n (where n is an integer between 2 and 32). At a certain point in the timing acquisition process, which normally occurs during the idle mode (prior to the contention frame), the booster subsystem 40 estimates the duration of a single slot (based on the fact that frame sync pulses are exactly 1.9 slots in duration). The booster subsystem 40 generates slots of the estimated duration and counts the number of such slots in a frame. The booster subsystem 40 compares the counted number of slots to the closest allowable number (16n) and alters its estimated slot duration so that it coincides with the allowable number of slots per frame.

The organizational process which takes place in the system of the present invention allows the booster subsystem 40 in each sensing station to be interchangeable. Thus, it is not necessary to preprogram each booster subsystem 40 to select a particular slot for data transmission because the transmission slot is determined during the contention frame shortly after the system is turned on.

Figure 2:
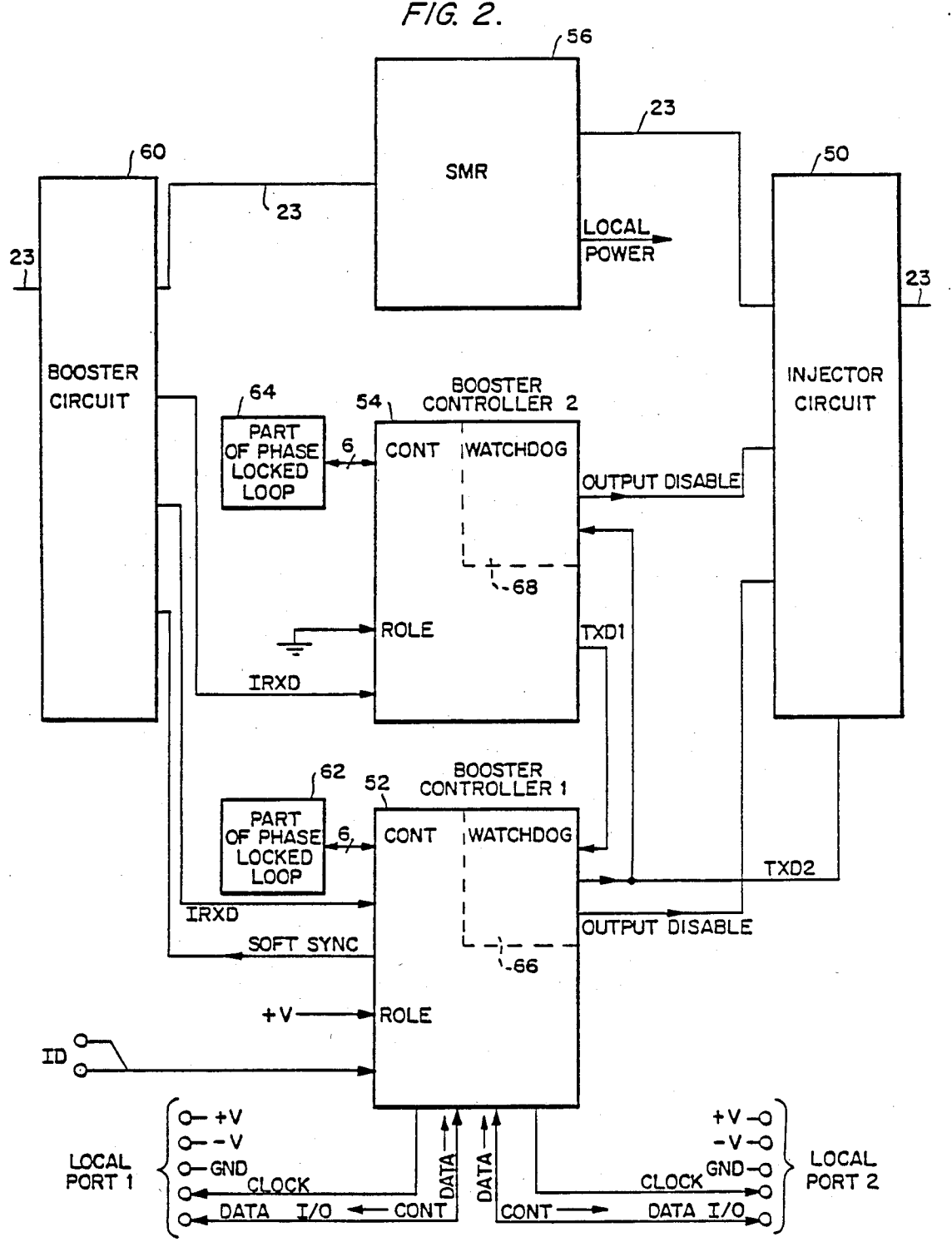
FIG. 2 is a block diagram of the booster subsystem of the present invention.

FIG. 2 is a block diagram of the booster subsystem 40 of FIG. 1. Although FIG. 1 illustrates the booster subsystem 40 as connected to the center conductor 23 of the transmission line 22 at a single point, the center conductor 23 of the transmission line 22 actually goes through the booster subsystem 40 in a continuous path. The path is continuous in the sense that data signals entering one end of the booster subsystem 40 will travel through the booster subsystem and will exit the opposite end virtually unchanged whether or not the booster subsystem 40 is operational. In addition, there is a constant current which is traveling from the constant current supply 30 to the primary and backup master clocks 24 and 26 and all current which comes into the forward end of the booster subsystem 40 (the side closest to the controller/receiver 28) will exit from the back end (the side closest to the primary and backup master clocks 24 and 26).

Referring to FIG. 2, an injector circuit 50 is connected to the forward end of the transmission line 22. Injector circuit 50 adds a digital data signal in the form of pulses onto the transmission line 22 during the assigned time slot for the particular sensing station 20. First and second booster controller circuits 52 and 54 are connected to the injector circuit 50 and provide digital data which is received from the channels through local ports 1 and 2. In particular, local port 1 is connected to a channel comprising the sensor 42 and the signal conditioning circuit 46, while local port 2 is connected to a channel comprising the sensor 44 and signal conditioning circuit 48. The booster controller circuits 52 and 54 generate transmit data signals TXD2 and TXD1, respectively.

The transmit data signal TXD1 from the booster controller circuit 54 is only used by the booster controller circuit 52, and that use is to determine whether the booster controller circuits 52 and 54 agree regarding the timing for transmission of data onto the transmission line 22, and thus whether the injector circuit 50 should be disabled. The transmit data signal TXD2 from booster controller circuit 52 is used similarly by the booster controller circuit 54 and is also transmitted onto the transmission line 22 by the injector circuit 50 if it is not disabled by either the booster controller circuit 52 or the booster controller circuit 54. In the preferred embodiment, the time slot is 20 bits wide and the transmit data signals TXD1 and TXD2 generated by the booster controller circuits 54 and 52, respectively, may be high during 18 bits of the 20 bits in the slot, the remaining 2 bits being reserved as a guard band between slot transmissions. The transmit data signal TXD2 from the booster controller circuit 52 contains digital data pulses throughout the 18 bits and corresponds to the digital data received from local ports 1 and 2 plus a parity bit and an identification bit. The transmit data signal TXD1 is generally similar to the signal TXD2 except that all data bits are high.

A switching mode regulator circuit 56 draws power from the transmission line 22 and provides power for the booster subsystem 40 and the signal conditioning circuits 46 and 48. The switching mode regulator circuit 56 passes current therethrough undiminished on the center conductor 23 of the transmission line 22; however, it causes a certain amount of voltage drop on the center conductor 23 and that voltage drop constitutes power tap off which the switching mode regulator circuit 56 converts into local usable power.

The booster subsystem 40 further comprises a booster circuit 60 which senses information travelling forward on the transmission line 22 and augments the edges of the traveling digital data signal by adding energy onto the transmission line 22. The booster circuit 60 receives a soft sync signal from the booster controller circuit 52 which alters the response time to the edges of the digital data signals on the transmission line 22. The soft sync signal helps the booster circuit 60 to control the timing of the edges which are traveling along the transmission line 22 to maintain the digital data signals on the transmission line 22 synchronous. The booster circuit 60 also has outputs for providing two received data signals IRXD (i.e., sync pulses and data from prior sensing stations 20) to the booster controller circuits 52 and 54.

The two booster controller circuits 52 and 54 are identical; however, in the preferred embodiment, the ROLE input of the booster controller circuit 54 is grounded while the ROLE input of the booster controller circuit 52 is connected to a supply voltage. This is done so that both booster controller circuits 52 and 54 can receive data signals (IRXD) of opposite polarity. The functions of the input of the received data signals IRXD to the booster controller circuits 52 and 54 are to allow the booster controller circuits 52 and 54 to (1) become synchronized and maintain synchronization to the sync pulses, (2) to participate in the organizational process when the system is initialized, (3) to detect mode information from the sync pulses, and (4) to generate the correct soft sync signal. These functions are described in detail below. The booster controller circuits 52 and 54 are connected to partial phase-lock loop circuits 62 and 64, respectively. The partial phase-lock loop circuits 62 and 64 combine with circuitry within the booster controller circuits 52 and 54, respectively, to form a phase-lock loop which is locked onto the sync pulses received at the receive data inputs to the booster controller circuits 52 and 54. The booster controller circuits 52 and 54 also detect width modulation of the sync pulses to determine the proper mode of operation (idle, data or calibration), to determine which frame is the contention frame, and to determine if a calibration function is to be performed.

The time of occurrence of the transmit data signal TXD1, which is provided by the booster controller circuit 54, is a function of the slot address stored in a register in the booster controller circuit 54 and a function of the current position in the frame which is determined by the booster controller circuit 54 in dependence upon the sync pulses received from the booster circuit 60. The booster controller circuits 52 and 54 each include a watchdog circuit 66 and 68, respectively, which monitor the timing of the transmission data signals TXD1 and TXD2. If one of the watchdog circuits 66, 68 senses that the other booster controller circuit is active outside of the assigned time slot, it will generate an output disable signal to the injector circuit 50, thereby disabling any transmissions by the injector circuit 50. Thus, if there is any failure within the booster subsystem 40, the failure will result in no transmission onto the transmission line 22, that is, a failure will not result in transmission outside of the assigned time slot.

Figure 3:
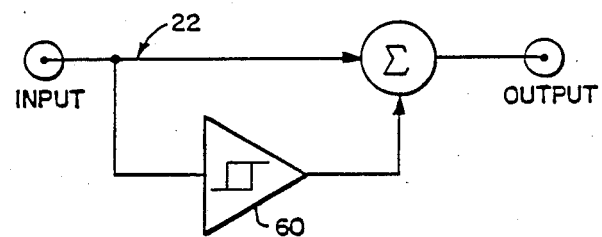
FIG. 3 is a block diagram of the booster circuit of the present invention.
Figure 4:
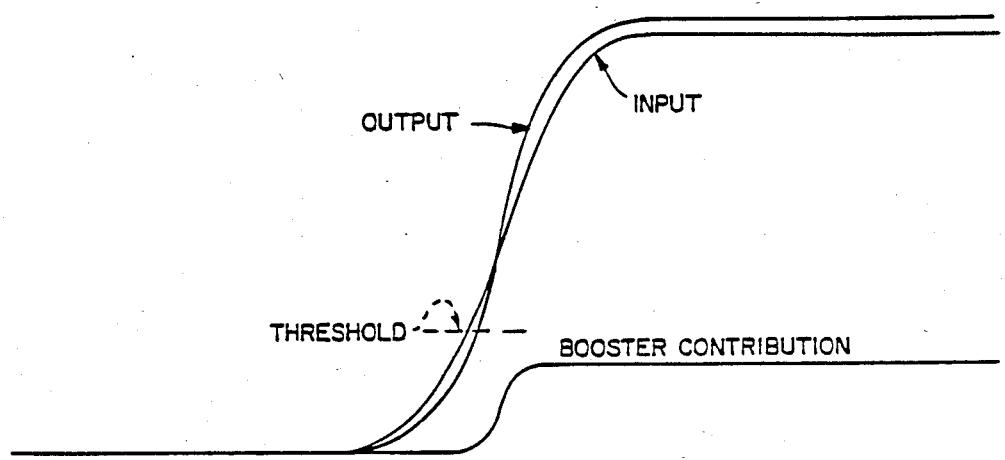
FIG. 4 is a graph illustrating a digital data signal, a booster signal and a boosted digital data signal.

FIG. 3 illustrates the booster circuit 60 of the present invention coupled to the transmission line 22. As noted above, in the preferred embodiment, the transmission line 22 is a coaxial cable; however, any suitable transmission line could be employed (e.g., a twisted wire pair). As illustrated in FIG. 3, the booster circuit 60 is not connected in series with the transmission line 22, as are prior art repeater circuits, so that even if the booster circuit 60 fails, a digital data signal can propagate along the transmission line 22, with the failed booster circuit 60 causing only slight attenuation of the signal. FIG. 4 illustrates an edge of the digital data signal as it appears on the transmission line 22, at the input of the booster circuit 60, and as it appears on the transmission line 22, at the output of the booster circuit 60, after being boosted. As illustrated in FIG. 4, the booster circuit 60 has a threshold level below which no digital data is detected, so that all noise below the threshold level is attenuated. Once a waveform edge, which is above the threshold level, has been detected by the booster circuit 60, the booster circuit 60 injects a constant amplitude signal on the transmission line 22, so that the waveform of the signal which is output on the transmission line 22 has a slightly larger amplitude and a sharper edge than the input signal which is propagating on the transmission line 22 at the input of the booster circuit 60. Thus, the booster circuit 60 of the present invention attenuates noise while sustaining the digital data signal and compensating for changes in the cable characteristics which may occur due to temperature, pressure, flexure, age, etc.

The booster circuit 60 of the present invention is particularly suitable for use in boosting digital data signals which are generated by a sensor array. When used in this manner, a plurality of booster circuits 60 (either as a part of the sensing stations 20 or as boosters alone) are coupled to the transmission line 22 to boost the digital data signals which are transmitted along the transmission line 22. In the preferred embodiment, the injected constant amplitude signal includes a current transient having a fixed amplitude and a voltage transient having a fixed amplitude. Since this fixed amplitude signal is added to the digital data signal, the effective gain in dB varies with signal strength, so that signals which are weakened by previously failed booster are boosted more than normal, thereby asymptotically restoring the digital data signal to its normal amplitude as its propagates past additional booster circuits 60 on the transmission line 22.

Figure 5:
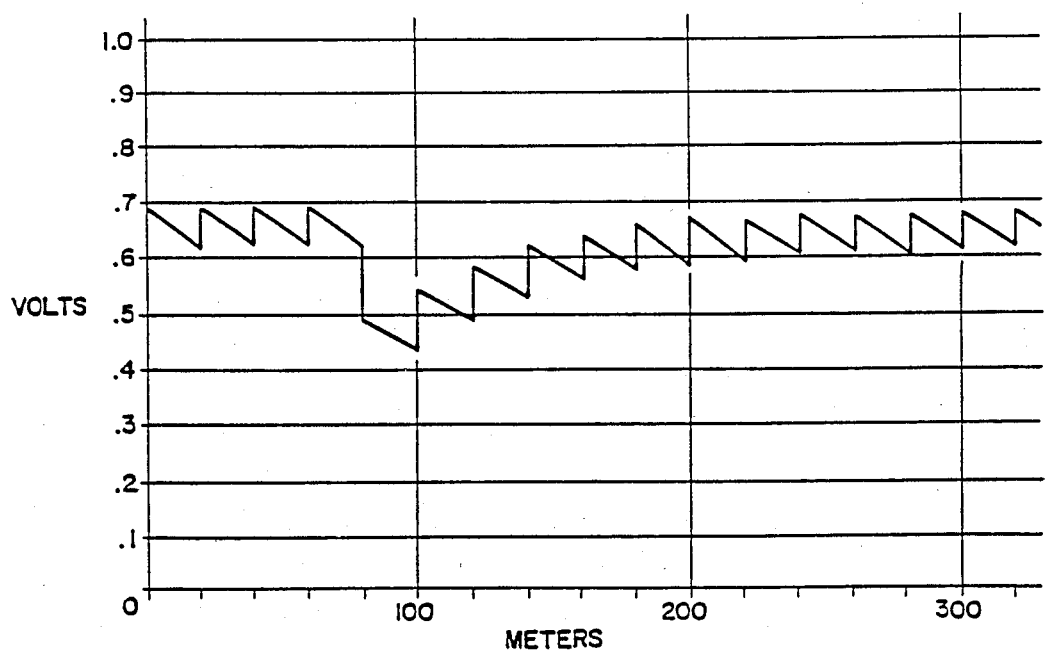
FIG. 5 is a graph illustrating how succeeding booster circuits in an array compensate for the failure of a booster circuit by boosting the digital data signal so that it asymptotically approaches its normal level.

As illustrated in FIG. 5, the failure of one or more of the plurality of booster circuits 60 will not cause the digital data signal to be severely attenuated, nor will it cause the entire sensor array to fail. FIG. 5 is a graph illustrating the amplitude of the digital data signal as it propagates along the transmission line 22. In particular, FIG. 5 illustrates an example in which a booster circuit 60, located at a point 80 meters along the transmission line 22, has failed. Thus, the digital data signal drops from an amplitude of approximately 0.7 volts at 60 meters to 0.45 volts at 100 meters due to attenuation caused by the transmission line 22 and the relatively slight attenuation caused by the failed booster circuit 60 which is located at the 80-meter point. However, the succeeding booster circuits (located at 100, 120, 140, 160, 180 and 200 meters) boost the digital data signal so that it asymptotically approaches its normal level. Thus, a booster system which employs the booster circuit 60 of the present invention overcomes the serial reliability problem of prior art repeater systems.

Figure 6:
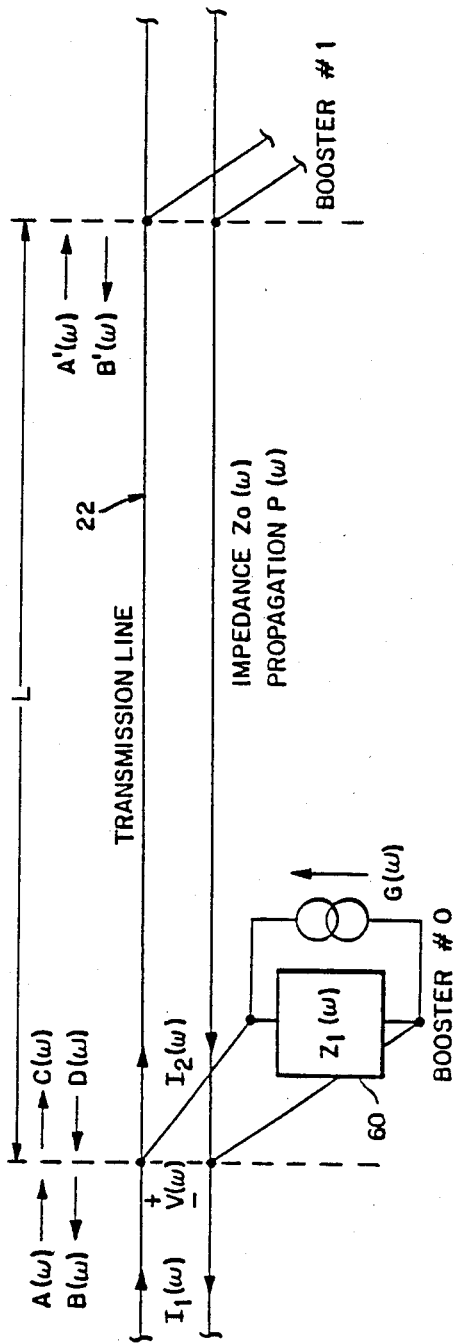
FIG. 6 is a schematic diagram used for explaining the procedure for analyzing the performance of the booster circuit of the present invention when an array of boosters is connected to a transmission line.

The following analysis of the performance of an infinite string of boosters spaced at uniform intervals on the data transmission line 22 is provided, with reference to FIG. 6 of the drawings. FIG. 6 illustrates the transmission line 22 and the booster circuit 60. It is assumed that a single rising edge, hereinafter referred to as an eigentransient, is propagating along the transmission line 22 and has evolved into a waveform shape which propagates with no further change in shape or amplitude except for a periodic variation, the period of which is the booster circuit spacing. The eigentransient of the system, as a function of the booster circuit spacing, the transmission line characteristics, and other system parameters, is considered below.

The object of a boosted transmission line design is to obtain an eigentransient which approximates a step function. It should have a rapid rise and minimal distortions such as overshoot, preshoot, ringing, sag, swell, or ghosts (i.e., delayed, attenuated secondary steps). Any or all of these distortions could occur as a result of single and multiple reflections from the booster circuits 60 and the dispersion and attenuation characteristics of the transmission line 22. If a system can be designed having an eigentransient which is suitably step-like, then the digital data signal logic waveforms will propagate since each edge will be independently boosted. The maximum data rate will be governed by the rise time of the eigentransient, since accurate operation requires that the adjacent edges of the waveforms remain separate. Another object of a boosted transmission line design is to achieve an eigentransient which, when viewed at a given booster, reaches a threshold (approximately 20% to 30% of the fully step height) at a point in time which precedes the beginning of that booster's injection onto the transmission line. This condition is necessary from the hardware realization of the booster due to causality.

Referring to FIG. 6, $Z_o(\omega)$ represents the characteristic impedance of the transmission line 22. This impedance $Z(\omega)$ is complex and frequency dependent. $P(\omega)$ represents the propagation loss and delay of a cable segment having length L, where L is the spacing between the booster circuits 60. The propagation function $P(\omega)$ has the attributes of a transfer function: It is complex and frequency dependent, and its magnitude and phase represent the loss and phase shift, respectively. The phase of $P(\omega)$ includes the effect of phase lag due to propagation delay in the transmission line segment. $V(\omega)$ refers to the voltage at a booster circuit 60 denoted BOOSTER #0. $I_1(\omega)$ refers to the current signal in the transmission line 22 immediately to the left of the BOOSTER #0 (as seen in FIG. 6). Any combination of $V(\omega)$ and $I_1(\omega)$ immediately to the left of the booster may be viewed as the superposition of a travelling wave to the right, $A(\omega)$ and a travelling wave to the left, $B(\omega)$. This is true for any impedance $Z_o(\omega)$ of the transmission line 22. The current and voltage in the transmission line are related to the travelling waves according to the following equations:

$$I_1(\omega) = (A(\omega) - B(\omega))/Z_o(\omega) \quad (1)$$

$$V(\omega) = A(\omega) + B(\omega) \quad (2)$$

Similarly, the current, $I_2(\omega)$, in the transmission line immediately to the right of BOOSTER #0 can be viewed as a travelling wave to the right $C(\omega)$ and a travelling wave to the left $D(\omega)$, which are related to the current and voltage in the line according to the following equations:

$$I_2(\omega) = (C(\omega) - D(\omega))/Z_o(\omega) \quad (3)$$

$$V(\omega) = C(\omega) + D(\omega) \quad (4)$$

The propagation function $P(\omega)$ applies to travelling waves travelling in either direction. Applying $P(\omega)$ to FIG. 6, the following equations are obtained:

$$A'(\omega) = C(\omega)P(\omega) \quad (5)$$

$$D(\omega) = B'(\omega)P(\omega) \quad (6)$$

where $A'(\omega)$ and $B'(\omega)$ are defined in a manner similar to $A(\omega)$ and $B(\omega)$ except that they represent the travelling waves which are located immediately to the left of BOOSTER #1.

Since it has been assumed that the waveform propagating through the system is the eigentransient, $A'(\omega)$ and $B'(\omega)$ are simply delayed replicas of $A(\omega)$ and $B(\omega)$. The delay from one booster to the next is denoted T. In the frequency domain, time delay is a phase lag which is proportional to frequency. The eigentransient assumption therefore is expressed by the following equations:

$$A'(\omega) = \exp(-j\omega T)A(\omega) \quad (7)$$

$$B'(\omega) = \exp(=j\omega T)B(\omega) \quad (8)$$

Figure 9:
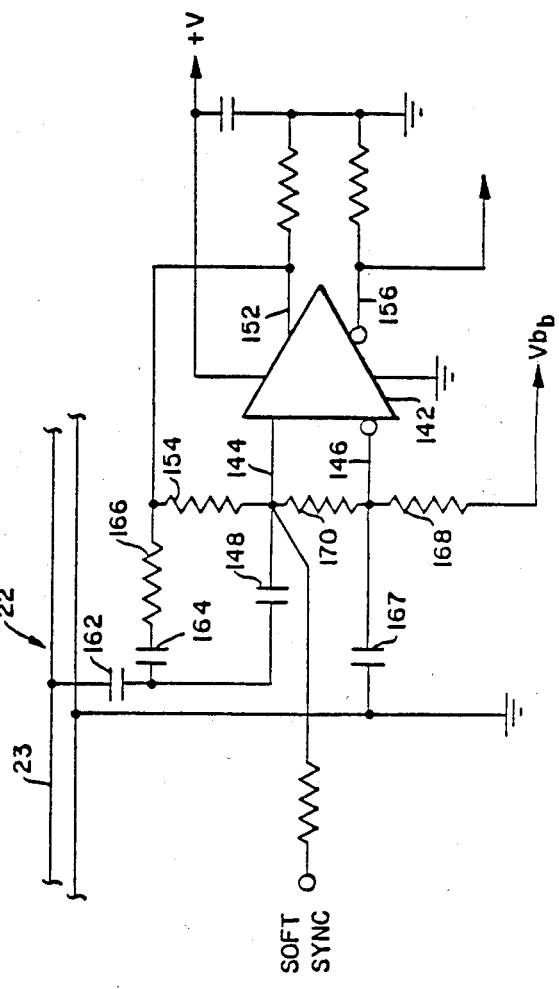
FIG. 9 is a circuit diagram of a third embodiment of the booster circuit 60 of FIG. 2 in accordance with the present invention.
Figure 8:
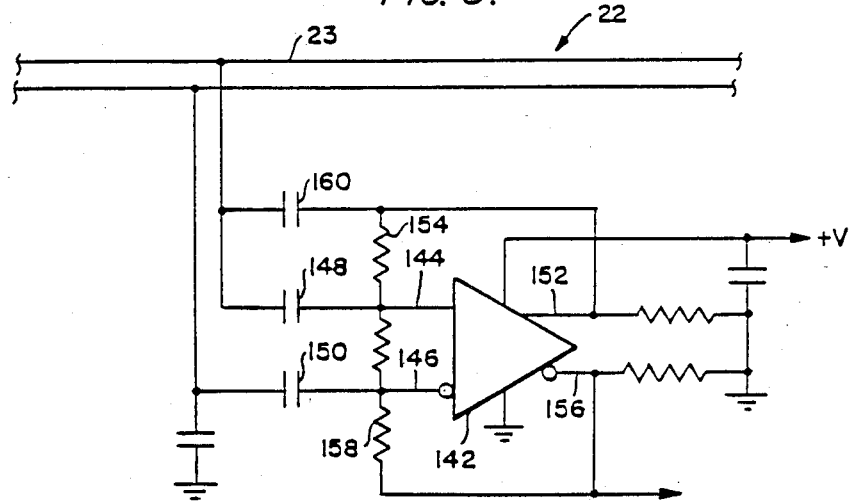
FIG. 8 is a circuit diagram of a second embodiment of the booster circuit 60 of FIG. 2 in accordance with the present invention.

$G(\omega)$ denotes the frequency domain representation (i.e., the Fourier Transform) of the current transient delivered into a short-circuit by the booster circuit 60 when it switches from a "0" to a "1" state at $t=0$. $Z_1(\omega)$ denotes the impedance of the booster circuit 60 as seen by the transmission line 22, when the booster circuit is at a fixed logic state. The functions $G(\omega)$ and $Z_1(\omega)$ can be calculated for any booster circuit within a general class of non-directional booster circuits 60 (FIGS. 8 and 9).

To apply this analysis to a directional booster circuit 60 (FIG. 7) would require the booster model to be expanded so that $Z_1(\omega)$ would include not only a shunt impedance but also a series impedance, and that $G(\omega)$ would include not only a current transint but also a voltage transient.

The functions defined with respect to FIG. 6, have an additional constraint due to the conservation of current at the point where the booster circuit 60 is attached to the transmission line 22, so that:

$$0 = I_1(\omega) - I_2(\omega) - V(\omega)/Z_1(\omega) + G(\omega) \quad (9)$$

Equations 1 through 9 constitute simultaneous linear equations in the unknowns A, A', B, B', C, D, $I_1$, $I_2$ and V. From these equations, using standard algebra, a solution for V can be obtained:

$$V(\omega) = \frac{G(\omega)}{\frac{1}{Z_1(\omega)} + \frac{2(\exp(j\omega T)P(\omega) - 1)(\exp(j\omega T)/P(\omega) - 1)}{Z_0(\omega) \exp(j\omega T)(P(\omega) - 1/P(\omega))}} \quad (10)$$

From equation 10 the eigentransient in the frequency domain can be calculated. The voltage eigentransient in the time domain can then be calculated by applying the inverse Fourier transform to the frequency domain result. By varying $G(\omega)$, $Z_1(\omega)$, $Z_0(\omega)$ and $P(\omega)$ the effects of various booster designs and various transmission line characteristics and booster spacings can be determined. This is most suitably performed as a computer analysis to obtain the desired design for the booster circuit 60 for a given transmission line 22.

To solve equation 10, one must assume a value for the parameter T which represents the propagation time of the eigentransient between adjacent boosters. If the value of T is varied while G, P, $Z_0$ and $Z_1$ are fixed, the calculated eigentransient changes shape and exhibits a shift along the time axis. Since $t=0$ is defined as the beginning of the current transient generated by the BOOSTER #0, and letting $T_d$ denote the response time of the booster circuit, the BOOSTER #0 must detect the eigentransient at $-T_d$. Thus, the eigentransient must cross the threshold of the booster at $-T_d$, and this crossing must not be preceded by any earlier crossing. In use of equation 10, T is varied iterativey until this condition is met. Through this iterative process, equation 10 yields the correct value of T in addition to the eigentransient shape based upon an assumed booster threshold, booster delay time, booster impedance $Z_1$, booster output transient G, booster spacing L, transmission line attenuation and dispersion P, and transmission line impedance $Z_0$.

From the above, a booster circuit can be designed for a specific transmission line 22, taking into account various choices for the booster circuit impedance, the transmission line impedance and the transmission line attenuation, dispersion, and propagation delay.

Figure 7:
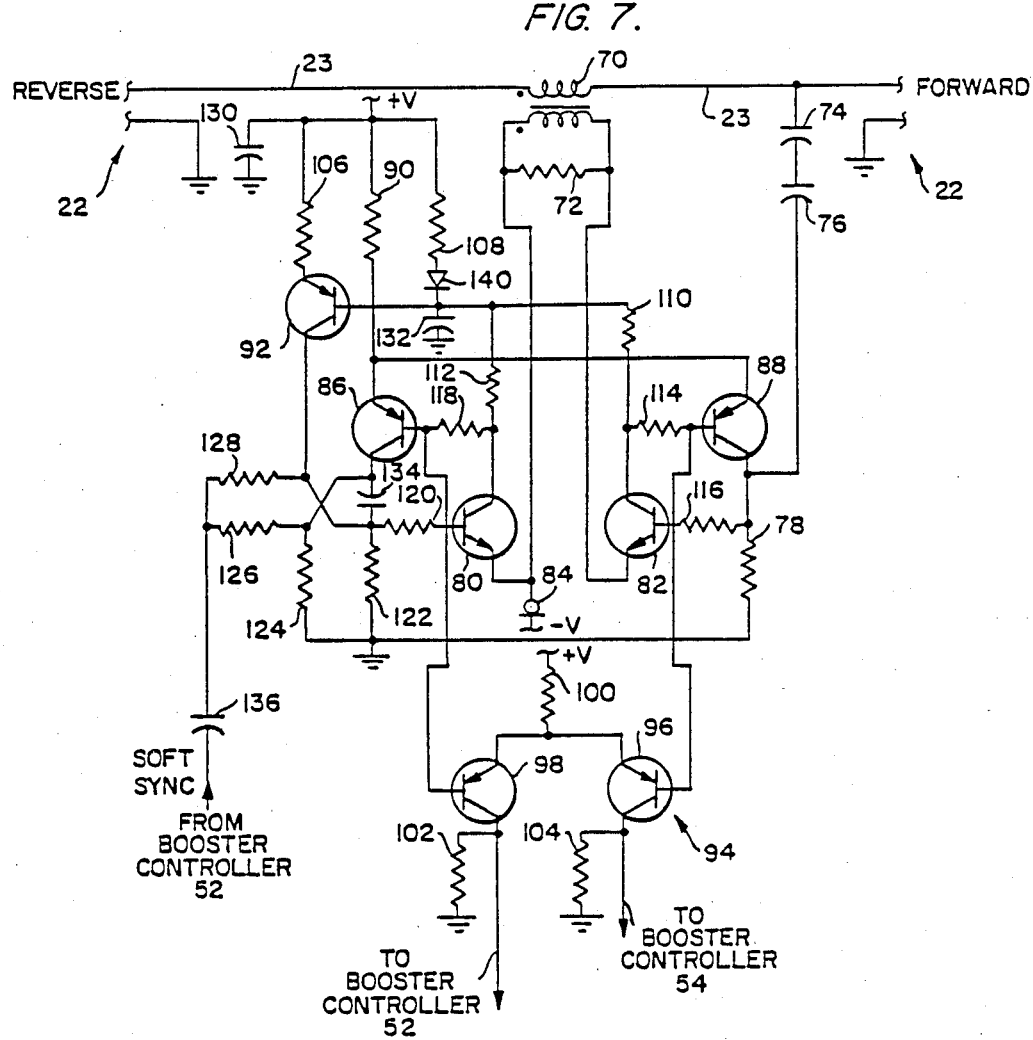
FIG. 7 is a circuit diagram of a first embodiment of the booster circuit 60 of FIG. 2 in accordance with the present invention.

FIG. 7 is a preferred embodiment of the booster circuit 60 illustrated in FIG. 2 which is designed to couple to the transmission line 22 comprising a coaxial cable.

Alternatively, the booster circuit 60 of FIG. 7 could be adapted to operate with a twisted pair transmission line. The booster circuit 60 of FIG. 7 is further designed to be coupled to a transmission line 22 on which the digital data signal to be boosted comprises binary signals having constant height edges and a lower bound on the time interval between the successive edges. Referring to FIG. 7, a transformer 70 and a resistor 72 form a coupling network, wherein the voltage across the resistor 72 is a function of the current in the center conductor 23 of the transmission line 22. Since the transformer 70 cannot couple DC levels, there is a certain high pass frequency cut off for the coupling network formed by the transformer 70 and the resistor 72. In the preferred embodiment this coupling is 3 dB down at 5 MHz. As the edges of the digital data signal travel on the transmission line 22, the rise and fall times of the edges are very rapid (approximately 15 nanoseconds). The edges show up as a voltage across the resistor 72; however as the edge falls the droop will not be coupled to the transformer 70. That is, the coupling network formed by the transformer 70 and the resistor 72 is edge sensitive to rapid transitions but is not level sensitive.

A second coupling network is formed by capacitors 74 and 76 and a resistor 78. This coupling network blocks DC levels but couples through high frequency levels. It is designed with a high pass frequency cut off a 5 MHz as is the coupling network formed by transformer 70 and resistor 72. The coupling network formed by the capacitors 74 and 76 and the resistor 78 produces a voltage across the resistor 78 which corresponds to the voltage on the center conductor 23 of the transmission line 22, so that this coupling network senses the voltage on the transmission line 22 while the coupling network formed by the transformer 70 and the resistor senses the current on the center conductor 23 of the transmission line 22.

An emitter coupled pair of transistors 80 and 82 form a current switch which receives a supply current from a constant current diode 84. The supply current from the constant current diode 84 will normally pass through one of the transistors 80 and 82, so that one is conducting and the other is cut off. The supply current from the constant current diode 84 can flow directly to the emitter of the transistor 80 or it can flow to the emitter of the transistor 82 through the coupling network formed by the resistor 72 and the transformer 70. The booster circuit 60 has two stable states. The state of the booster circuit 60 is governed by the state of the switch formed by transistors 80 and 82, which is, in turn, controlled by a linear combination of the following three voltages:

1. the base voltage of the transistor 80;
2. the base voltage of the transistor 82; and
3. the voltage difference between the emitters of transistors 80 and 82.

Both the current component and the voltage component of the travelling wave on the transmission line 22 influence the state of the booster circuit 60. The current component of a travelling wave on the transmission line 22 is coupled to the voltage difference between the emitters of transistors 80 and 82 by the coupling network formed by transformer 70 and resistor 72. The voltage component of a travelling wave on the transmission line 22 is coupled to the base voltage of transistor 82 by the coupling network formed by capacitors 74 and 76, and resistor 78.

When the forward directed travelling wave on the transmission line 22 impinges on the booster circuit 60, the linear combination of voltages which controls the state of the booster circuit 60 (by controlling the state of the switch formed by transistors 80 and 82) receives equal and in-phase contribution from the voltage and current components of the travelling wave on the transmission line 22. Conversely, whenever a reverse directed travelling wave on the transmission line 22 impinges on the booster circuit 60, the linear combination of voltages which controls the state of the booster circuit 60 receives opposite phase and equal amplitude contributions from the voltage and current components of the travelling wave on the transmission line 22. Thus, the booster circuit 60 is selectively responsive to forward travelling signals on the transmission line 22 due to the above-described constructive interference between the voltage and current components of a forward directed travelling wave, and due to the above-described destructive interference between the voltage and current components of a reverse-directed travelling wave. Further, the booster circuit 60 is selectively responsive to only the high frequency portion of a forward-directed travelling wave on transmission line 22 due to the above-described high pass filtering characteristic of the two coupling networks.

Thus, the transistor pair 80 and 82 alternately switches between first and second states in dependence upon the combined effect of the above three inputs.

A pair of transistors 86 and 88 form a second switching element having a constant emitter current supplied by a resistor 90. As in the case of the first switching element, the current supplied by the resistor 90 will normally flow entirely through one or the other of the transistors 86 and 88 and will switch to the opposite transistor in response to the base input provided by the switching element formed by transistors 80 and 82. That is, the second switching element will switch between first and second states in dependence upon the switching of the first switching element. Thus, when the first switching element formed by transistors 80 and 82 switches, then nanoseconds later, the second switching element formed by the transistors 86 and 88 switches. This is because the outputs of the transistors 80 and 82 are coupled to the inputs of the transistors 86 and 88, respectively. The output of the switching element formed by transistors 86 and 88 influences the state of the booster circuits 60 through the coupling from the collectors of the transistors 86 and 88 to the bases of transistors 80 and 82, respectively. The polarity of this coupling is such that it provides positive feedback within the booster circuit 60. The high frequency portion of the positive feedback from the switching element formed by transistors 86 and 88 to the switching element formed by transistors 80 and 82 is coupled through capacitor 134 and resistor 120, and causes the booster circuit 60 to switch rapidly and completely once switching has been initiated by a signal edge travelling on the transmission line 22. The low frequency and D.C. portion of the positive feedback of the switching element formed by transistors 86 and 88 to the switching element formed by transistors 80 and 82 is coupled by resistor 116, and causes the booster circuit 60 to remain in either the first or second state indefinitely in the absence of further signal edges travelling on the transmission line 22. As a result of this bistable characteristic of the booster circuit 60, and because of its insensitively to droop (i.e. low frequency distortion)

of the data signal on the transmission line 22, the booster circuit 60 reconstructs the D.C. content of a data signal travelling on the transmission line 22 even when that D.C. component is missing or distorted.

When the switching elements within the booster circuit 60 switch, the current step which occurs in the emitters of transistors 80 and 82 is conducted through the coupling network formed by resistor 72 and transformer 70. The impedance of this coupling network converts the current step into a high pass filtered voltage step. The high pass filtered voltage step is injected onto the transmission line 22 by the transformer 70 and appears on the transmission line 22 as if from a floating voltage source in series with the transmission line 22. When the second switching element in the booster circuit 60 switches from either a first state to a second state or second state to first state, the high frequency portion (i.e., 5 MHz and up in the preferred embodiment) of the current step which occurs in the collector of transistor 88 is coupled to and injected onto the transmission line 22 by capacitors 74 and 76, and appears on the transmission line 22 as if from a current source shunted across the transmission line 22. When switching occurs in the booster circuit 60, the voltage which is injected onto the transmission line 22 by the transformer 70, and the current which is injected onto the transmission line 22 by capacitors 74 and 76 produce a forward directed travelling wave with the shape of a step function which has been high pass filtered. This injected travelling wave combines linearly with and travels with and boosts the original incident signal edge which cause the booster circuit 60 to switch.

As long as the edges in the travelling waves signal on the transmission line 22 alternate their polarity (which is true for the type of signals which the booster circuit 60 is designed to transmit—i.e., binary logic signals), the booster circuit 60 will respond to each edge by switching its state and will thus boost each edge in the travelling wave.

A transistor 92 generates a constant current on its collector at all times to establish the DC bias on the base of the transistor 80, which establishes the booster threshold for the rising edge, so that the booster circuit 60 operates when this threshold is exceeded.

The level of current supplied by the transistor 92 is set so that the booster threshold for a rising edge equals that for a falling edge, the booster threshold for a falling edge being a function both of the current through a collector of transistor 88 when it is conducting current, and of the current supplied by the collector of transistor 92. A receive data interface circuit 94 is formed by a pair of transistors 96 and 98 and resistors 100, 102 and 104. The receive data interface circuit 94 provides the receive data signals IRXD to the booster controller circuits 52 and 54 in dependence upon the state of the booster circuit 60. Resistors 106, 108, 110, 112, 122, and 124; capacitors 130 and 132; and diode 140 are used for biasing purposes.

Resistors 114, 116, 118 and 120 are used for suppression of UHF instabilities in the transistors 80, 82, 86 and 88 which could cause oscillatory bursts during switching transients and lead to erratic behavior of the booster circuit 60 with respect to the response threshold.

As described above, the state of the booster circuit 60 is influenced by:

1. internal positive feedback from transistors 86 and 88;
2. the high frequency portion of the forward travelling waves on the transmission line 22; and
3. biasing supplied by transistor 92.

One additional factor which influences the state of the booster circuit is the soft sync signal which is generated by the booster controller circuit 52. The soft sync signal is coupled to the base voltage of the transistor 80 by resistors 126 and 128 and capacitor 136. The soft sync signal modulates the response threshold of the booster, making it slightly larger or smaller, to slightly retard or accelerate each travelling signal edge on the transmission line 22 as the edge passes the booster circuit 60, thereby maintaining the edges of the travelling wave on the transmission line 22 synchronized.

FIG. 8 is a first alternate embodiment of the booster circuit 60 which omits the directional properties of the preferred embodiment of FIG. 7. Referring to FIG. 8, the booster circuit 60 includes a differential line receiver 142 having an input 144 and an inverted input 146. The input 144 is coupled to the transmission line 22 by a capacitor 148, while the inverted input 146 is coupled to the transmission line 22 by a capacitor 150. The differential line receiver 142 has an output 152 connected to a feedback resistor 154 and an inverted output 156 connected to a feedback resistor 158. In the preferred embodiment, the differential line receiver 142 is one third of a model F 10116 triple differential line receiver manufactured by Fairchild Semiconductor, Inc. and the outputs 152 and 156 are differential emitter coupled logic outputs. Each waveform edge of the digital data signal on the transmission line 22 is coupled into the differential line receiver 142 through the capacitors 148 and 150, thereby causing the differential line receiver 142 to change state, following the signal state. Each time the differential line receiver 142 changes state, a current transient is injected onto the transmission line 22 through a capacitor 160. The current transient boosts each waveform edge, thereby enhancing its amplitude and rise time as illustrated in FIG. 4.

The initial state of the embodiments of the booster circuit 60 illustrated in FIGS. 7 and 8 when power is turned on is arbitrary. If the booster circuit 60 is initially at a logic level which is opposite that on the transmission line 22, the first waveform edge of the digital data signal does not cause the booster circuit 60 to change state. Thereafter, the booster circuit 60 functions correctly, i.e., its logic state follows the logic state of the digital data signal.

The booster circuit 60 of FIG. 7 or 8 does not boost noise signals corresponding to waveform edges which are below the threshold level. Therefore, noise and partial reflections are attenuated by the transmission line 22 and by the loading effect of the booster circuit 60, while the digital data signals, which are above the threshold, are boosted. The threshold level of the booster circuit 60 of FIG. 8 is determined by the amount of positive feedback which is provided through the resistors 154 and 158 and can be varied with the particular design. The threshold level of the booster circuit 60 of FIG. 7 is fixed at one-fourth the nominal signal amplitude, but with addition of resistors to create DC feedback from the collectors of transistors 86 or 88 to the base of transistor 80 the threshold can be altered.

The booster circuit 60 of FIG. 8 is coupled to the transmission line 22 only through its capacitors (148, 150 and 160). Likewise, the booster circuit 60 of FIG. 7 is coupled to the transmission line 22 only through capacitors 74 and 76 and transformer 70. Thus, the DC offset between the booster power supply and the transmission line 22 is arbitrary. In addition, although the booster circuit 60 in the embodiments of FIGS. 7 and 8 is only AC coupled, it follows the digital data signal including its DC content. This is because the DC content of a bi-level waveform can be inferred from its edges and because the booster can sense the edges via its AC coupling.

FIG. 9 is a second alternate embodiment of the booster circuit 60 of the present invention, wherein elements referenced by the same numerals in FIGS. 8 and 9 represent corresponding elements. In the embodiment of FIG. 9, the inverted output of the differential line receiver is not used for feedback purposes. Capacitor 162 is a DC blocking capacitor. Capacitor 164 and resistor 166 perform the same coupling function as capacitor 160 in FIG. 8. Capacitor 167 and resistors 168 and 170 are used for biasing purposes in the embodiment of the booster circuit 60 illustrated in FIG. 9. FIG. 9 also illustrates the input of a soft sync signal from the booster controller circuit 52.

In another alternate embodiment, the booster circuit 60, is implemented by a Schmitt trigger circuit. The Schmitt trigger circuit is bistable when no pulse is present, but is set high by positive pulses which exceed its hysteresis zone and is set low by negative pulses which exceed its hysteresis zone.

Figure 10:
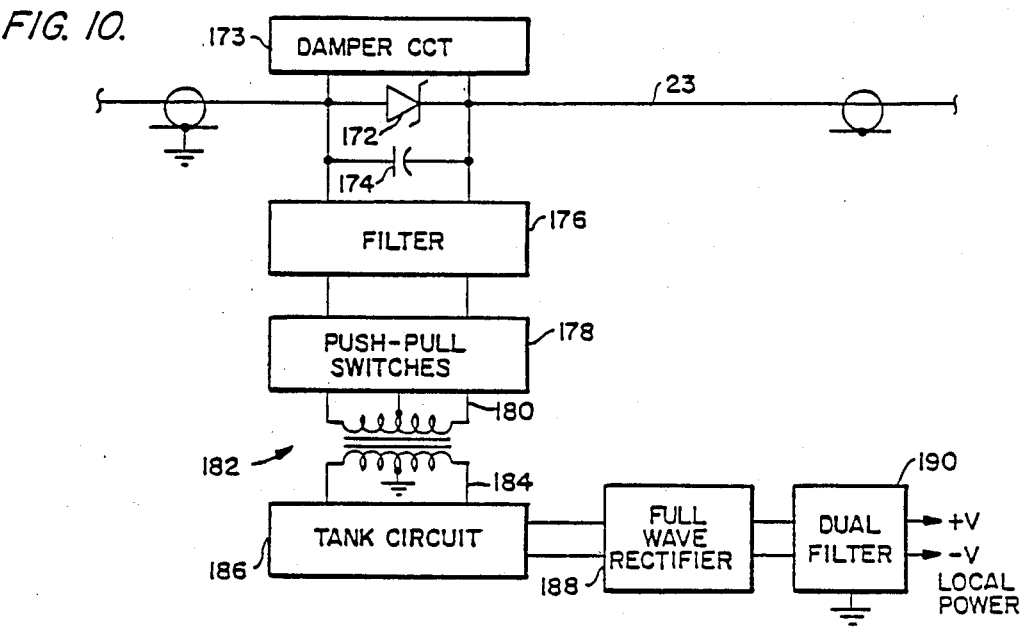
FIG. 10 is a block diagram of the switching mode regulator circuit 56 of FIG. 2 in accordance with the present invention.

FIG. 10 is a block diagram of the switching mode regulator circuit 56 of FIG. 2. In the preferred embodiment, the switching mode regulator circuit 56 acts as a gyrator. A gyrator is a two port device where the current in port 1 is proportional to the voltage on port 2 and the current in port 2 is proportional to the voltage on port 1. Thus, the output voltage of the switching mode regulator circuit 56 is regulated by the current supplied by the constant currnt power supply 30, and the input voltage to the switching mode regulator circuit 56 which determines its tap off power, is proportional to the load current drawn by the sensing station 20 from the output of the switching mode regulator circuit 56.

A voltage limiter circuit 172 provides two backup current paths for the supply current. In the preferred embodiment, the constant current power supply 30 provides a 600 milliamp dc constant current on the center conductor 23 of the coaxial cable 22. A capacitance 174 allows high frequency data edges on the transmission line 22 to pass through the switching mode regulator circuit 56 without any attenuation. Further, if the supply current will not flow into the switching mode regulator circuit 56, the voltage across the capacitance 174 will begin to rise until it reaches a point where the regulator circuit 172, comprising the two backup current paths, starts conducting. A filter circuit 176 receives a supply current and a voltage is developed across a filter capacitor within the filter circuit. A push-pull switch circuit 178 is connected to the filter circuit 176 and acts as a multivibrator that produces an AC waveform on the primary 180 of an isolation transformer 182. Thus, a square wave is present on the secondary 184 of the isolation transformer 182. The secondary 184 of the isolation transformer 182 is connected to a tank circuit 186 which is a series resonant tank. The tank circuit is driven by a voltage square wave to generate a larger amplitude sinusoidal waveform. The tank circuit provides an output voltage which is proportional to its input current (i.e., the current in the secondary 184 of the isolation transformer 182), and an output current which is proportional to its input voltage. A full wave rectifier 188 rectifies the sinusoidal output of the tank circuit 186 and a dual filter 190 filters the output of the full wave rectifier 188 to provide the supply voltage for the sensing station 20. A damper circuit 173, including a resistor 175 and a capacitor 177, eliminates a resonant interaction of the capacitance 174 and the capacitors in the filter circuit 176 with the capacitors in the dual filter 190, such resonant interaction being mediated by the gyrator property of the switching mode regulator circuit 56.

Figure 11:
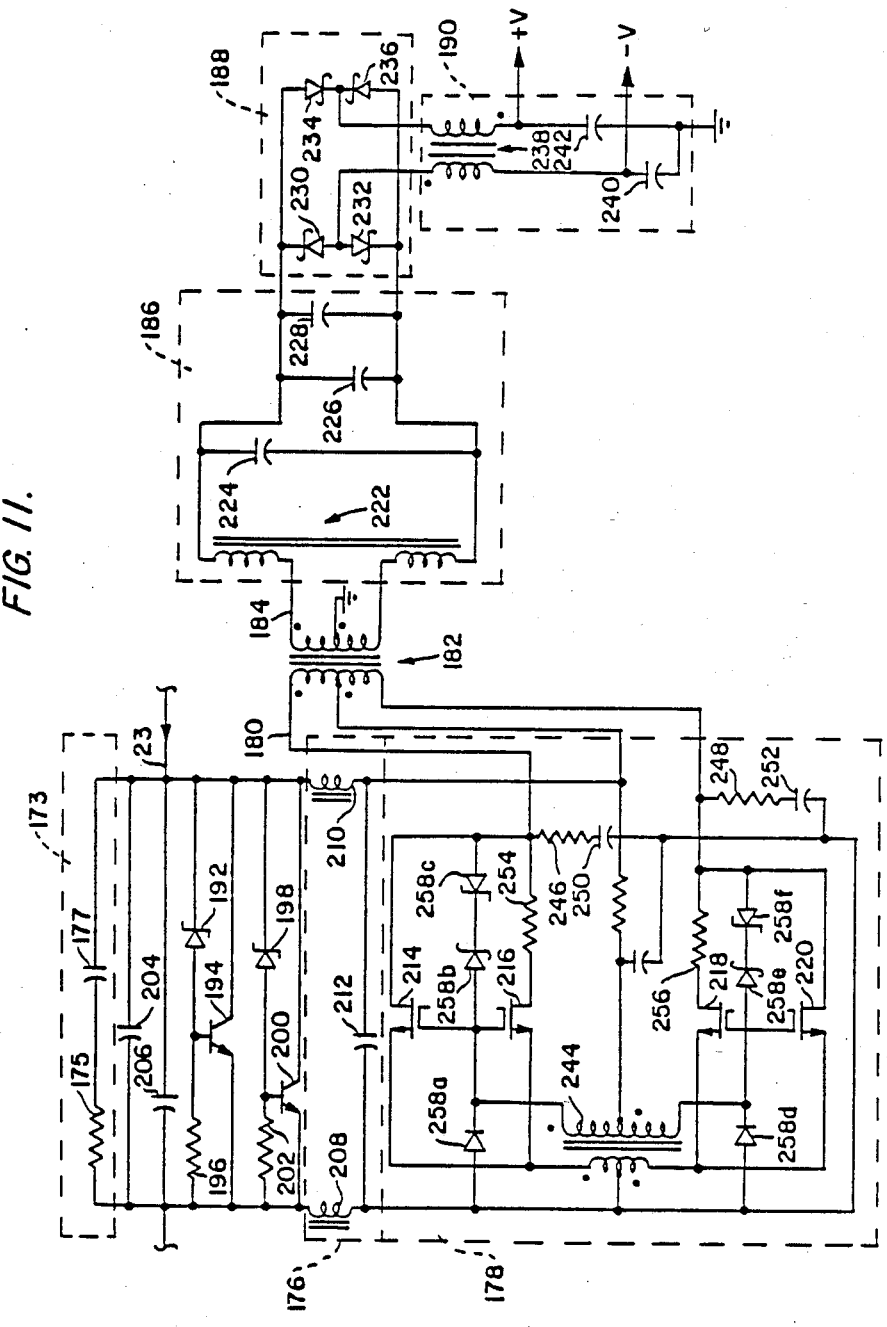
FIG. 11 is a circuit diagram of the switching mode regulator circuit 56 of FIG. 10.

FIG. 11 is a circuit diagram for the switching mode regulator circuit 58 of FIG. 10. As noted above, the regulator circuit 172 provides two backup current paths for the current flowing on the center conductor 23 of the transmission line 22. The first backup current path comprises a diode 192, a transistor 194 and a resistor 196. The second backup current path comprises a diode 198, a transistor 200 and a resistor 202. The capacitance 174 comprises capacitors 204 and 206. The filter circuit 176 comprises inductors 208 and 210 and a capacitor 212.

The push-pull switch circuit 178 comprises a first pair of transistors 214 and 216 and a second pair of transistors 218 and 220. The transistors 214 and 216 conduct as a pair, that is, when one is on both are on; similarly the transistors 218 and 220 conduct as a pair.

The tank circuit 186 comprises an inductor 222 having a split winding and capacitors 224, 226 and 228. The full wave rectifier 188 comprises four diodes 230, 232, 234 and 236. The dual filter 190 comprises an inductor 238 having dual windings and capacitors 240 and 242.

The filter circuit 176 together with the capacitors 204 and 206 form a filter that prevents ripple generated in the switching mode regulator circuit 56 from travelling to the transmission line 22. As noted above, backup current paths are provided through transistors 194 and 200, however, in normal operation, the supply current flows through the inductor 210 to the active circuitry of the switching mode regulator circuit 56 and back to the transmission line 22 through the inductor 208. When the current flows through the inductor 210, this causes a voltage drop across the capacitor 212. The push-pull switch circuit 178, including the transistors 214, 216, 218 and 220, acts as a multivibrator which produces an AC waveform on the primary 180 of the isolation transformer 182. Thus, transistors 214 and 216 conduct for half of the time and transistors 218 and 220 conduct for the other half of the time, so that there is a square wave at the output of the transistor 214. As a result, a square wave is generated on the secondary 184 of the isolation transformer 182 and a sinusoidal circulating current is produced in the tank circuit 186 due to the resonance in the inductor 222 and the capacitors 224, 226 and 228. Although, in the preferred embodiment, three capacitors 224, 226 and 228 are provided, it is only necessary to have one capacitor in the tank circuit 186. A sinusoidal voltage is produced across the capacitor 224 and a sinusoidal current circulates in the tank circuit 186. The sinusoidal circulating current circulates through the secondary 184 of the isolation transformer 182, so that a transformed current flows through the primary 180 of the isolation transformer 182. One half of the primary supports the current on half of the sinusoid and the other half supports the current on the other half of the sinusoid, so that the current flowing into the center tap of the primary 180 of the isolation transformer 182 is always flowing unidirectionally, i.e., it is always flowing into the center tap. This current is a full wave rectified sine wave and for one half cycle it flows through the upper half of the primary 180 of the isolation transformer 182 and is conducted through the transistors 214 and 216. In the other half cycle the current flows through the bottom half of the primary 180 of the isolation transformer 182 and through transistors 218 and 220. Thus, in both instances, both halves of the current at the primary center tap of the isolation transformer 182 come from the side of the capacitor 212 connected to the inductor 210 and travel through the transistors 214 and 216 and 218 and 220 through a transformer 244 and back to the side of the capacitor 212 connected to the inductor 208.

The push-pull switch circuit 178 further include resistors 246 and 248 and capacitors 250 and 252 for absorbing spiky transients on the square waves going into the transformer 182. Resistors 254 and 256 cause the transistors 216 and 218, respectively, to conduct less current than the transistors 214 and 220. The transistors 216 and 218 are included in the push-pull switch circuit 178 to improve the start-up characteristics because they have a lower threshold voltage than the transistors 214 and 220. Thus, the transistors 216 and 218 enable the switching mode regulator circuit 56 to become active with a smaller input voltage. Diodes 258a, b, c, d, e and f clip the sinusoidal currents at the outputs of the secondary of the transformer 244 to a square wave for input to the gates of the transistors 214, 216, 218 and 220.

Figure 12:
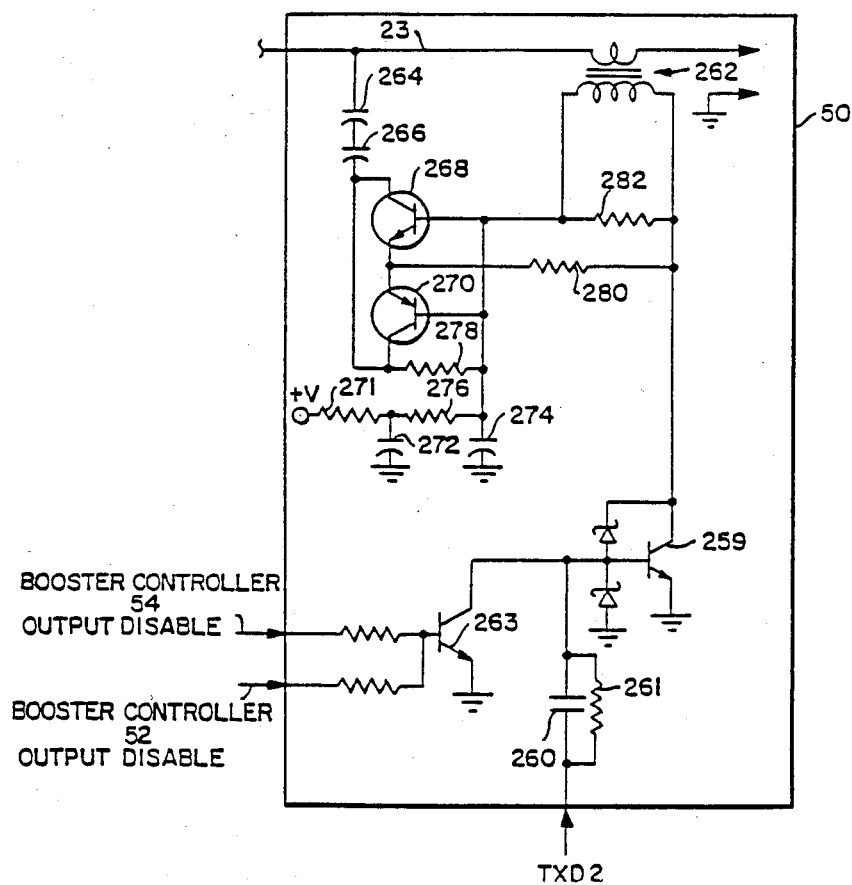
FIG. 12 is a circuit diagram of the injector circuit 50 of FIG. 2.

FIG. 12 is a circuit diagram of the injector circuit 50 of FIG. 2. The injector circuit 50 adds pulses on the transmission line 22, in the form of a digital data signal, under the control of the transmit data signal TXD2 from the booster controller circuit 52. The transmit data signal TXD2 drives a switching transistor 259 through a coupling circuit comprising a capacitor 260 and a resistor 261. An inhibiting transistor 263 inhibits the switching transistor 259 when activated by the output disable signal from either of the booster controller circuits 52 and 54. The injector circuit 50 includes a transformer 262 which injects a series voltage on the center conductor 23 of the transmission line 22. A current is simultaneously injected onto the center conductor 23 through capacitors 264 and 266. This injection of current and voltage results in a forward travelling wave which has the same directional properties as the injected voltage and current which are injected by the booster circuit 60. That is, the forward travelling wave components from the current and voltage combine and the reverse components cancel out. A pair of transistors 268 and 270 form a switch which tends to isolate the injector from the transmission line 22 when the injector circuit 50 is inactive.

The injector circuit 50 couples a very strong signal onto the transmission line 22 compared to the booster circuit 60. That is, the injector circuit 50 must inject the full amplitude (approximately 700 millivolts) as illustrated in FIG. 4. Thus, the injector circuit 50 must be strongly coupled to the transmission line 22, and the switch comprising transistors 268 and 270 must allow the coupling to disengage, so that the injector circuit 50 does not excessively load the line when it is inactive. The injector circuit 50 further includes capacitors 272 and 274, and resistors 271, 276, 278, 280 and 282.

FIG. 13 is a block diagram of the booster controller circuit 52 of FIG. 2, including the part of the phase locked loop 64 which is not contained in the integrated circuit which constitutes the booster controller circuit 52.

In the preferred embodiment, the booster controller circuits 52 and 54 are formed by integrated circuits using CMOS technology and are identical in construction, with only minor variations in the connection of the input and output. Thus, only the structure of the booster controller circuit 52 will be described in detail.

Referring to FIG. 13, a receive data decoder 284 receives the received data signal IRXD from the booster circuit 60 and selectively inverts the received data signal IRXD in dependence upon the ROLE input of the booster controller circuit 52. The received data signal IRXD includes the sync pulses shown in FIG. 14 and may also contain data pulses generated by previous sensing stations 20 (i.e. sensing stations located closer to the coax termination). The receive data decoder 284 converts the received data signal IRXD to the received data signal RXD which is input to various circuits in the booster controller circuit 52.

A low voltage sensor 286 is connected to the switching mode regulator circuit 56 and generates a power on reset signal when the voltage supply to the booster controller circuit 52 is below a predetermined threshold. The power on reset signal is employed to reset the logic conditions in the booster controller circuit 52 to an initial condition.

A booster controller master timing circuit 228 is connected to the receive data decoder 284 and receives the received data signal RXD therefrom. The booster controller master timing circuit contains an entire phase locked loop, and includes the part of phase locked loop 64 (FIG. 2). The booster controller master timing circuit 288 senses the sync pulses on the received data signal RXD and generates a set of timing signals which are synchronized to the sync pulses on the received data signal RXD. These timing signals include, in order of descending frequency, bit timing signals, slot timing signals, subframe timing signals, frame timing signals and superframe timing signals. These timing signals further include delayed bit timing signals. These timing signals are transmitted to the various circuits in the booster controller circuit 52.

A mode detector circuit 290 is connected to the receive data decoder 284 to receive the received data signal RXD therefrom, and is connected to the booster controller master timing circuit 288 to receive delayed bit timing signals therefrom. The mode detector circuit 290 senses coded information in the sync pulses on the received data signal RXD by detecting variations in the pulse widths of the sync pulses which are sent by the primary or backup master clock circuit 24 or 26. Based on the detected variation in pulse widths, the mode detector circuit 290 determines the selected mode and outputs mode signals. The various mode signals include idle vs. data vs. contention frame mode, calibration mode, signal K, and self test.

A local point interface circuit 292 is connected to the signal conditioning circuits 46 and 48 of local ports 1 and 2 (see FIG. 1). In addition, the local port interface circuit 292 is connected to the booster controller master timing circuit 288 to receive timing therefrom and is connected to the mode detector circuit 290 to receive the mode signal. The local port interface circuit 292 generates clock signals to local ports 1 and 2 at a frequency which is jumper selectable (i.e. it may be set by a programming pad which is external to the integrated circuit comprising the booster controller circuit 52) and collects 8-bit data blocks from the local ports 1 and 2 at a repetition rate which is also jumper selectable. The local port interface circuit 292 provides a sync pulse on the data I/O line when it wants to receive data from the local port. The data I/O line is a bidirectional line so that the local data is received by the local port interface circuit 292 on the data I/O line. The voltage on the data I/O line conveys the sync pulse from the local port interface circuit 292, while simultaneously the current in the data I/O line conveys the data to the local port interface circuit 292. The local port interface circuit 292 also provides two control signals to the local ports 1 and 2 in dependence upon the mode signal generated by the mode detector circuit 290. The control signals include a CAL signal which indicates the calibration is to take place and a signal K which may be customized to fit the needs of a particular system. The control signals CAL and K are conveyed to the local ports 1 and 2 by controlling the pulse width of the sync pulse on the data I/O line.

A transmission slot controller circuit 294 is connected to the booster controller master timing circuit 288 to receive timing signals, and to the mode detector circuit 290 to receive the mode signals. The transmission slot controller circuit 294 operates during the contention frame mode (indicated by a mode signal) to generate contention pulses which are transmitted through a data handler circuit 296 to the injector circuit 50 as a transmission data signal TXD2. The transmission slot controller circuit 294 generates contention pulses throughout the contention frame, while at the same time receiving the contention pulses from previous sensing stations 20 which are present on the received data signal RXD. Due to the directionality of the injector circuit 50, the received data signal RXD contains only contention pulses which are generated by prior sensing stations 20 (i.e. sensing stations coupled to the transmission line 22 at a position closer to the coax termination 23). The transmission slot controller circuit 294 operates on a slot by slot basis throughout the contention frame; that is, beginning in the first slot of the contention frame, it generates a contention pulse and if no contention pulse is received on received data signal RXD, then the transmission slot controller circuit 294 will claim the first slot for subsequent data transmissions. On the other hand if a contention pulse from a previous sensing station 20 is received on the received data signal RXD in the first slot, the transmission slot controller circuit 249 will generate a contention pulse in the second slot in an attempt to claim that slot. Thus, the transmission slot controller circuit 294 generates 1 contention pulse per slot for each slot in the frame until a slot is claimed by virtue of generating a contention pulse and not receiving a contention pulse in a particular slot. Once a slot has been claimed, the transmission slot controller circuit 294 will not generate any further contention pulses.

As an additional feature, the transmission slot controller circuit 294 may be programmed to claim multiple slots (e.g. 2, 4 or 8) in a frame. If multiple slots are to be claimed, the slots are uniformly spaced throughout the frame. For example, if the transmission slot controller circuit 294 is programmed to claim two slots in a frame, it will attempt to claim a first slot during the first-half of the frame, and if it fails to claim a slot during the first-half of the frame, it will not continue to attempt to claim its first slot during the second-half of the frame. If the transmission slot controller circuit 294 is successful in claiming a slot in the first-half of the frame, it will then remain silent (i.e. it will not generate contention pulses) until the corresponding slot in the second-half of the frame is reached. The transmission slot controller circuit 294 will emit a single contention pulse in this corresponding slot and will claim this slot if no contention pulse is received on the received data signal RXD. The first slot which the transmission slot controller circuit 294 attempts to claim is referred to as a prime claim and the transmission slot controller circuit 294 repeatedly transmits contention pulses during the predetermined portion of the frame which is designated for a prime claim. The remaining slots which are attempted to be claimed (if multiple slots are to be claimed) are referred to as secondary claims and only a single contention pulse is generated in an attempt to claim each secondary claim.

Once the transmission slot controller 294 has claimed a transmission slot, the transmission slot address is stored in a register in the transmission slot controller 294 and a latch is set in the transmission slot controller 294 to indicate that a valid transmission slot address has been stored.

In order to avoid pulse pile up on the coaxial cable 22 (i.e., a plurality of pulses all being transmitted onto the line at the same time during a slot) the various sensing stations 20 are pre-wired to vary the location of the contention pulse within a slot for the particular sensing station. In the preferred embodiment, there are 9 different types of sensing stations 20 which are dispersed in the sensor array. The particular type of sensing station 20 is selected by jumpers in the sensing station 20, and is indicated by an ID signal generated by the transmission slot controller circuit 294. This ID signal controls the location of the contention pulse within the slot and is further provided to the data handler circuit 296. Since the sensing stations 20 generates contention pulses during different times in the time slot, it is possible for the transmission slot controller circuit 294 to receive a contention pulse in the received data signal RXD from a prior sensing station 20 before its' assigned time for generating a contention pulse somewhat later in the slot. If a contention pulse is detected on the received data signal RXD before the contention pulse has been generated by the transmission slot controller 294, the generation of the contention pulse by the transmission slot controller 294 is inhibited, because the potential for claiming that time slot has already been negated. This further avoids any problems due to pulse pile up on the transmission line 22.

The data handler circuit 296 receives local port data from the local port interface circuit 292, processes the data from the local port interface, adds a parity bit, adds an ID bit in dependence upon the ID signal from the transmission slot controller circuit 294 and the superframe timing from the booster controller master timing 288, and sends out a data burst to the injector circuit 50 as transmission data signal TXD2. The total data burst is 18 bits and includes 16 data bits, one parity bit and one ID bit. The ID bit is varied by the data handler circuit 296 on a frame to frame basis to generate a cyclical code, so that if 6 frames in a row are reviewed, the 6 ID bits can be decoded to determine the ID of the particular sensing station 20. This ID information is used by the receiver/controller 28 to detect which of the sensing stations 20 remain operational.

The watchdog circuit 298 detects erroneous operation by either of the booster controller circuits 52 and 54, and generates an output disable signal in the case of a malfunction. Thus, the watchdog circuit 298 receives the transmission data signal TXD1 from the booster controller circuit 54 and checks for corresponding transmission activity during each slot when the transmission slot controller circuit 294 is calling for either a contention pulse or data transmission on the transmit data signal TXD2. A data transmission slot is indicated by the SNS signal which is generated by the transmission slot controller circuit 294 and received by the watchdog circuit 298. A slot in which a contention pulse should be transmitted is indicated by the CP-GATE signal which is generated by the transmission slot controller 294 and received by the watchdog circuit 298. If the watchdog circuit 298 senses activity from the booster controller circuit 54 when there is not supposed to be activity, or if it does not sense activity from the booster controller circuit 54 when there is supposed to be activity, the watchdog circuit 298 will generate an output disable signal.

Normally, when the transmission slot controller circuit 294 generates the signal CP-GATE, the booster controller circuit 54 will generate a contention pulse, so that the watchdog circuit 298 should be satisfied. However, it should be recalled that the transmission slot controller circuit 294 can inhibit the generation of a contention pulse late in a time slot if a contention pulse from a prior sensing station 20 is received early in the time slot. This could result in the booster controller circuit 54 not generating a contention pulse, while the transmission slot controller 294 is generating the CP-GATE signal. To overcome this discrepancy, the watchdog circuit 298 is also connected to receive the received data signal RXD, and during the contention frame, the watchdog circuit 298 will accept activity on the received data signal RXD in lieu of activity on the transmission data signal TXD1. This enables the watchdog circuit 298 to operate properly even though the booster controller circuits 52 and 54 can inhibit the generation of contention pulses on TXD2 and TXD1, respectively.

A self test circuit 300 is employed to determine whether the watchdog circuit 298 is functioning properly. In general, the self test circuit 300 modifies the inputs to the watchdog circuit 298 from the transmission slot controller circuit 284. The self test circuit 300 receives the mode signal, the ROLE signal, and timing signals. The self test circuit 300 can be actuated to cause the watchdog circuit 298 to look for data transmission in a particular slot or it can mask a slot where data should be transmitted to cause the watchdog circuit to look for the absence of transmission of data. When actuated, the self test circuit 300 will cause the watchdog circuit 298 to detect an error if the watchdog circuit 298 is operating properly, so that the watchdog circuit 298 will generate an output disable signal. The self test circuit 300 comprises a command decoder which decodes 4 different self-test commands sent as pulse width modulations on sync pulse 4 received in the received data signal RXD by the mode detector 290. The decoded command signals are sent to the watchdog circuit 298 to alter the operation of the watchdog circuit 298 which will transmit an output disable signal if it is operating properly.

A soft sync circuit 302 receives the received data signal RXD, the timing signals from the booster controller master timing circuit 288 and the mode signal, and generates a soft sync signal which is input to the booster circuit 60. The soft sync signal modifies the threshold for actuating the booster circuit 60, thereby effectively modulating the booster circuit's response time to travelling edges on the transmission line 22. This modifies the throughput delay of edges in their transit through the booster circuit 60 and ultimately tends to keep the edges synchronized on the transmission line 22. The soft sync circuit 302 gives the sensing station 20 the capability of compensating for small time disturbances in the edges travelling along the transmission line 22 and maintains the system in a synchronized condition. The timing signals which are received by the soft sync circuit 302 are employed to alter the booster circuit's response threshold from a high value to a low value at the time at which synchronized edge should arrive. Thus, if an edge arrives at the sensing station 20 early, it encounters a high threshold and the response of the booster circuit 60 is slow, thereby slightly delaying the edge and pushing the edge toward the ideal time. Conversely, if the edge arrives late, it encounters a low threshold so that the response of the booster circuit 60 is relatively fast, thereby speeding up the edge toward the ideal time.

In the preferred embodiment, the travelling edges are moved by approximately plus or minus one nanosecond at each sensing station 20. The timing signals which are received by the soft sync circuit 302 indicate to the soft sync circuit 302 the ideal time at which an edge should be received. The received data signal RXD is input to the soft sync circuit 302 because the soft sync signal must make a low to high transition if the booster circuit 60 is already in the low state, that is, if the received data signal RXD is low, whereas the soft sync signal has to make the opposite transition if the received data signal RXD is high. The soft sync signal is disabled for the passage of the trailing edge of each sync pulse since the sync pulse trailing edges form the reference timing for the booster controller master timing circuit 288, which is synchronized to these edges. This allows the sync pulse trailing edges to travel along the transmission line 22 at what is referred to as native velocity. Thus, the trailing edges are neither sped up nor delayed by the soft sync signal. However, the sync pulses are boosted by the booster circuits 60. Further, the phase-lock loop of the booster controller master timing circuit 288 is synchronized to this native velocity and all edges in the system are modified and synchronized to that basic timing through the soft sync signal.

Figure 15:
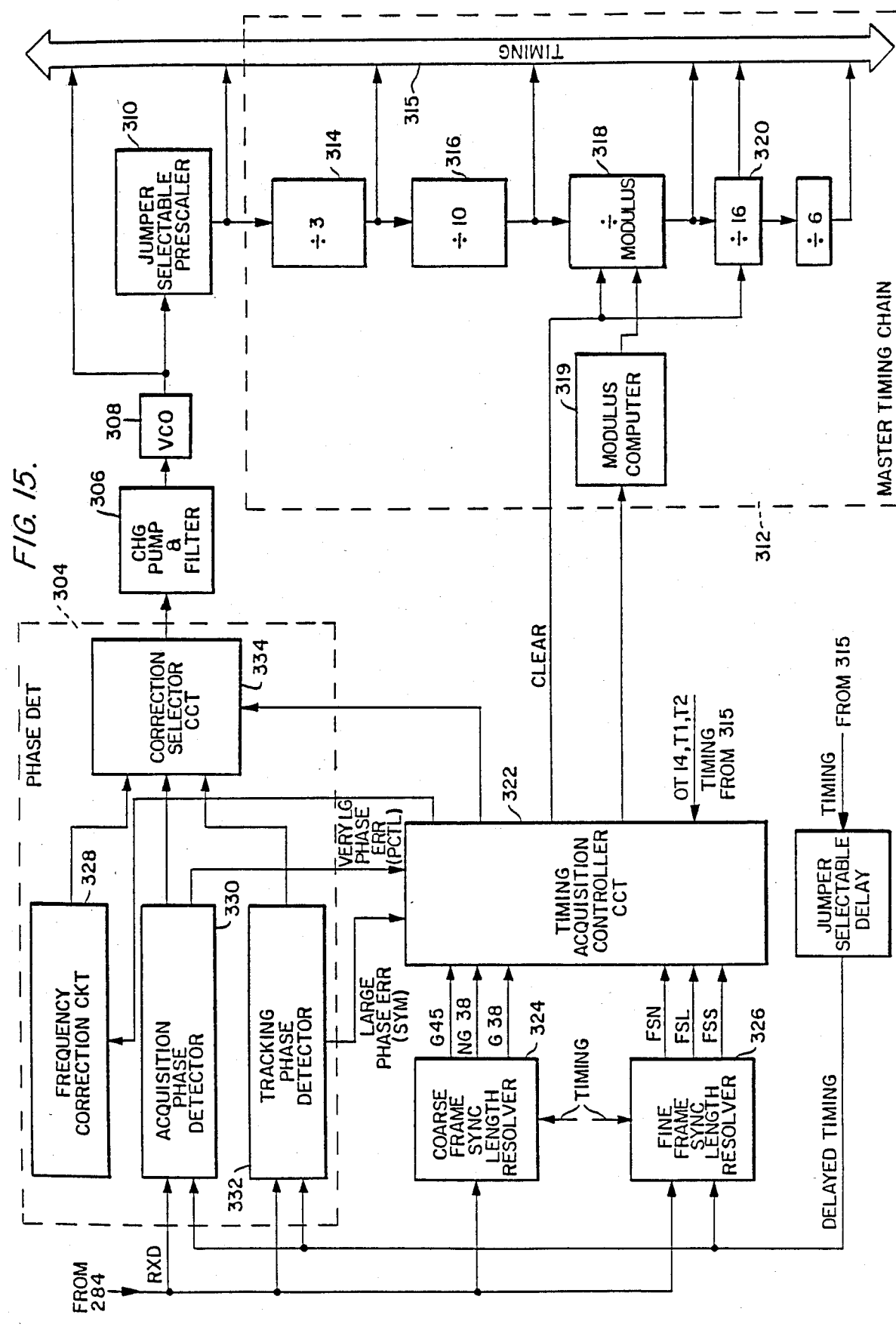
FIG. 15 is a block diagram of the booster controller master timing circuit 288 of FIG. 13.

FIG. 15 is a block diagram of the booster controller master timing circuit 288 of FIG. 13 including a phase detection and correction circuit for timing acquisition and phase tracking. A charge pump and filter 306 receives a correction signal from the phase detection and correction circuit 304 and provides a voltage to a voltage controlled oscillator 308. The filter in the charge pump and filter 306 is an active RC filter having a pole at zero frequency, a zero at a real frequency, and two poles at complex conjugate frequencies. The voltage controlled oscillator is of standard design.

A jumper selectable prescaler 310 divides the output frequency of the voltage controlled oscillator 308 by a selected binary number (e.g. 1, 2, 4 or 8) and provides this divided output to a master timing chain 312. The output of the jumper selectable prescaler 310 is a clock signal at one and a half times the bit rate. The master timing chain 312 includes a divider circuit 314 which generates a clock signal at half the bit rate. At this point in the booster controller master timing circuit 288 there are 6 different phases of clock signals on a timing bus 315. The divider circuit 316 divides the output of the divider circuit 314 by 10 generate clock signals at the slot rate; a divider circuit 318 divides the output of the divider circuit 316 by the modulus to generate clock signals at two times the subframe rate (16 times per frame); and a divider circuit 320 divides the output of the divider circuit 318 by 16 to generate clock signals at the frame rate. All of the timing signals (i.e., the output of the voltage control oscillator 308, the jumper selectable prescaler 310, the divider circuit 314, the divider circuit 316, the divider circuit 318, and the divider circuit 320 are input to the timing bus 315 and can identify any one-third of a bit throughout a frame. Thus, the timing signals can convey timing information with a resolution of one-third of a bit. Modulus computer 319 provides the divider circuit 318 with the appropriate division factor based on the system timing.

The phase detection and correction circuit 304 includes a frequency correction circuit 328, an acquisition phase detector circuit 330, a tracking phase detector circuit 332 and a correction selector circuit 334. The tracking phase detector 332 generates a large phase error signal (SYM) for input to the timing acquisition controller circuit 322, and the acquisition phase detector 330 generates a very large phase error signal (PCTL) for input to the timing acquisition controller circuit 322.

The booster controller master timing circuit 288 further includes a timing acquisition controller circuit 322 which controls the phase detection and correction circuit 304, the modulus computer 319, and the dividers 318 and 320. The timing acquisition controller circuit 322 is a state sequence machine having 16 states and receives inputs from a coarse frame sync length resolver 324 (inputs G45, NG38, G38 relating to bits per frame sync pulse) and a fine frame sync length resolver 326 (inputs FSN, FSL, FSS relating to fine resolution of frame sync pulse length). The timing acquisition controller circuit 322 controls whether the system is in the INLOCK states or the timing acquisition states. The timing acquisition process include a preceeding frequency acquisition and a following phase acquisition.

The timing acquisition controller circuit 322, through it various states, selects which of three signals will be provided to the charge pump and filter 306 and hence the voltage controlled oscillator 308. These signals are generated by the frequency correction circuit 228, the acquisition phase detector 330 and the tracking phase detector 332. The acquisition phase detector 330 makes timing measurements and timing corrections only at a frame rate because it only measures phase error on the frame sync pulses. In contrast, the tracking phase detector 332 measures phase errors on all of the sync pulses (i.e. 8 times as many as the acquisition phase detector 330). The tracking phase detector 332 takes over after the acquisition phase detector 330 has reduced the phase error to a relatively small value. Thus, the tracking phase detector 332 is able to hold the phase error to a smaller value because it is making corrections eight times as frequently. During frequency acquisition, both phase detectors 330 and 332 are turned off while the frequency correction circuit 328 generates a frequency correction signal for input to the correction selector circuit 334 which in turn feeds the correction signal to voltage controlled oscillator 308 via the charge pump and filter 306.

The timing acquisition controller circuit 322, through its 16 states, also controls the rate of correction applied by the frequency correction circuit, initializes and increments and decrements the modulus computer 319, and presets and clears the dividers 318 and 320 at certain times in the timing acquisition process.

Figure 16A:
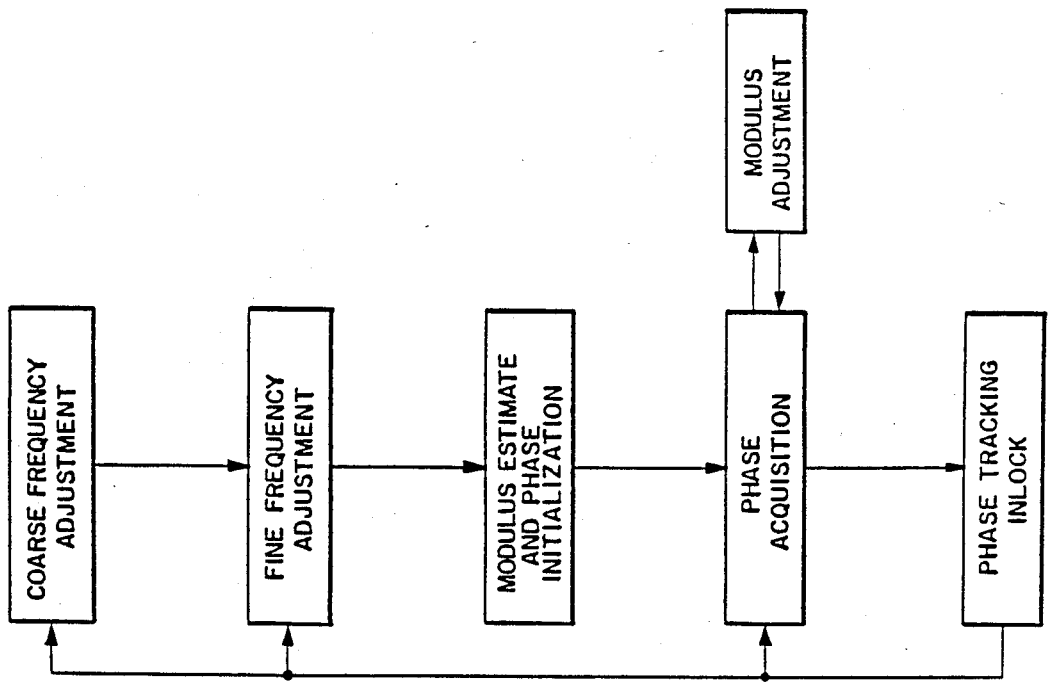
FIG. 16A is a flow diagram for illustrating the operation of the timing acquisition controller circuit 322 of FIG. 15.

The operation of the timing acquisition controller circuit 322 is generally described in FIG. 16A. Referring to FIG. 16A, the timing acquisition controller circuit 322 initially performs a coarse frequency adjustment in an attempt to identify the frame sync pulses (FIG. 14). Since, in the preferred embodiment, a frame sync pulse is 38 bits long, and since no other pulses on the transmission line 22 are longer than 18 bits, the timing acquisition controller circuit 322 estimates that any sync pulse above 32 bits long is a frame sync pulse. During the coarse frequency adjustment, the frequency of the voltage controlled oscillator 38 is adjusted until the longest pulses are between 32 and 45 bits long. The timing acquisition controller circuit 322 then sequences to the states for fine frequency adjustment. In this process, the frequency of the voltage controlled oscillator 308 is gradually adjusted so that the frame sync pulses converge towards a 38 bit length. At this point, the voltage controlled oscillator 308 will be running at approximately the correct frequency, however, the modulus (number of slots per frame divided by 16) will be unknown. Thus, once the fine frequency adjustment process has taken place, the timing acquisition controller circuit 322 sequences to the states for modulus estimation and phase initialization. The phase is initialized at the beginning of a frame, that is, when a frame sync pulse is received, and the duration of one frame is measured in units of 16 slots. The number of 16 slot increments is counted and the result is the initial estimate of the modulus. This estimated modulus is stored and the timing acquisition controller circuit 322 sequences to the states for phase acquisition. During the phase acquisition process, the system is operating like a phase-lock loop and the acquisition phase detector 330 is operated until the phase error in the phase lock loop settles toward zero. At this point, the system is capable of measuring the duration of a frame sync pulse with greater precision and it is determined whether the modulus estimate is in error. If the modulus estimate is in error, the timing acquisition controller circuit 322 sequences to the states for modulus adjustment and increments or decrements the modulus estimate by 1, thereby creating a phase and frequency error in the phase lock loop. Thus, the timing acquisition controller circuit 322 is sequenced back to the states for phase acquisition until the error is reduced to zero. Once the phase acquisition has been performed and the modulus determined, the timing acquisition controller circuit 322 sequences to the INLOCK states, during which the timing acquisition controller circuit 322 monitors the large phase error signal from the tracking phase detection circuit 332 for indications of loss of phaselock. Normally the system will remain in the INLOCK state during operation unless there is an unexpected transient which causes the system to lose lock. In this case, the timing acquisition controller circuit 322 will sequence to the appropriate states to, for example, perform phase acquisition etc.

Figure 16B:
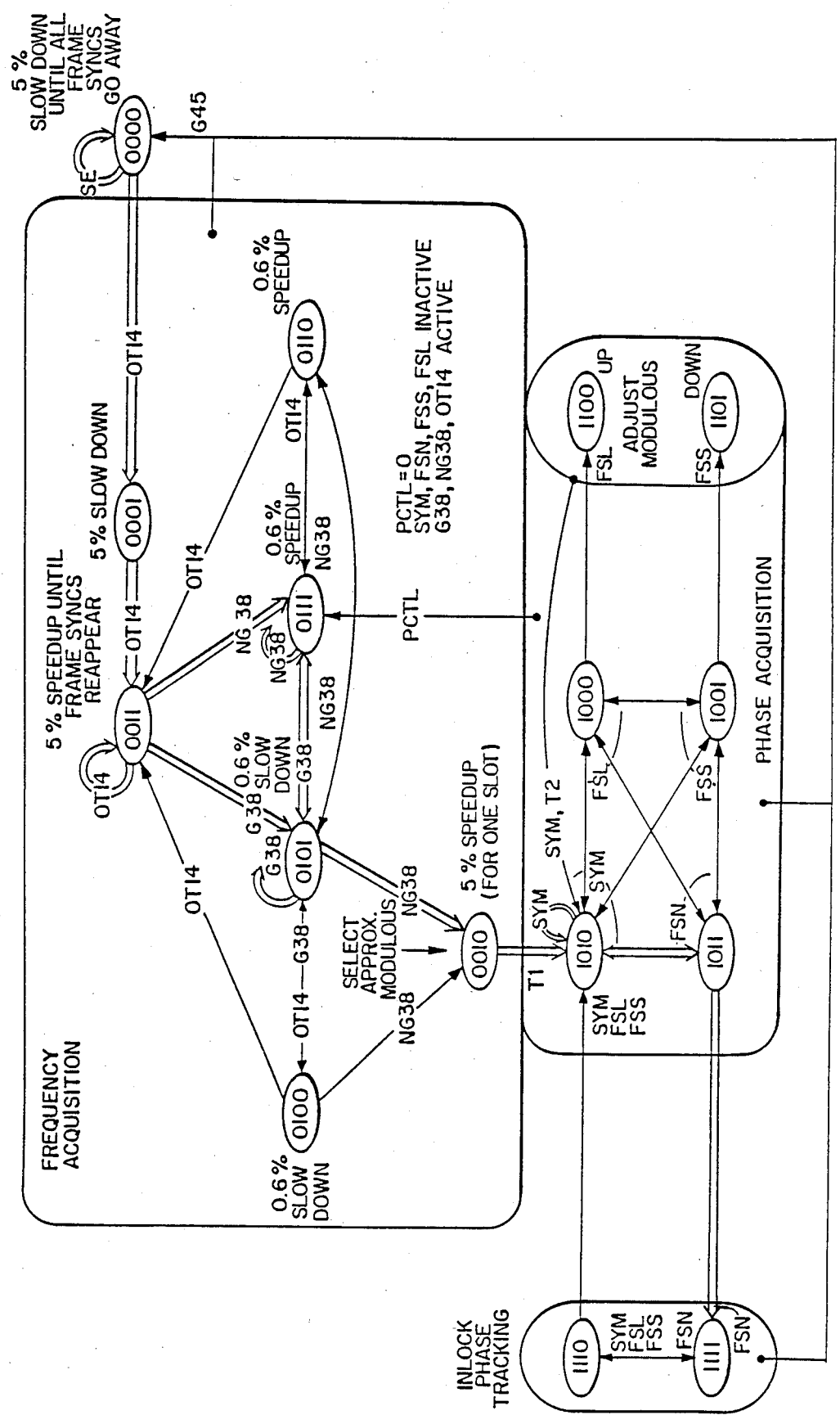
FIG. 16B is a state map for the timing acquisition controller circuit 322 of FIG. 15.

FIG. 16B is a state map for the timing acquisition controller circuit 322 illustrating all 16 states through which it can sequence as well as the signals in the booster controller master timing circuit 288 which cause state transitions. The double line transitions in FIG. 16B illustrate the normal state transition pattern.

From this map, a set of Boolean equations and a logic circuit can be developed in a straight forward manner.

During the sequencing of the states of the timing acquisition controller circuit 322, the modulus register 319 is preset with an initial value and is incremented or decremented until the final modulus value is determined and the timing acquisition controller circuit 322 goes to the INLOCK condition. At that point, the modulus register 319 will contain the correct system modulus.

Figure 17A:
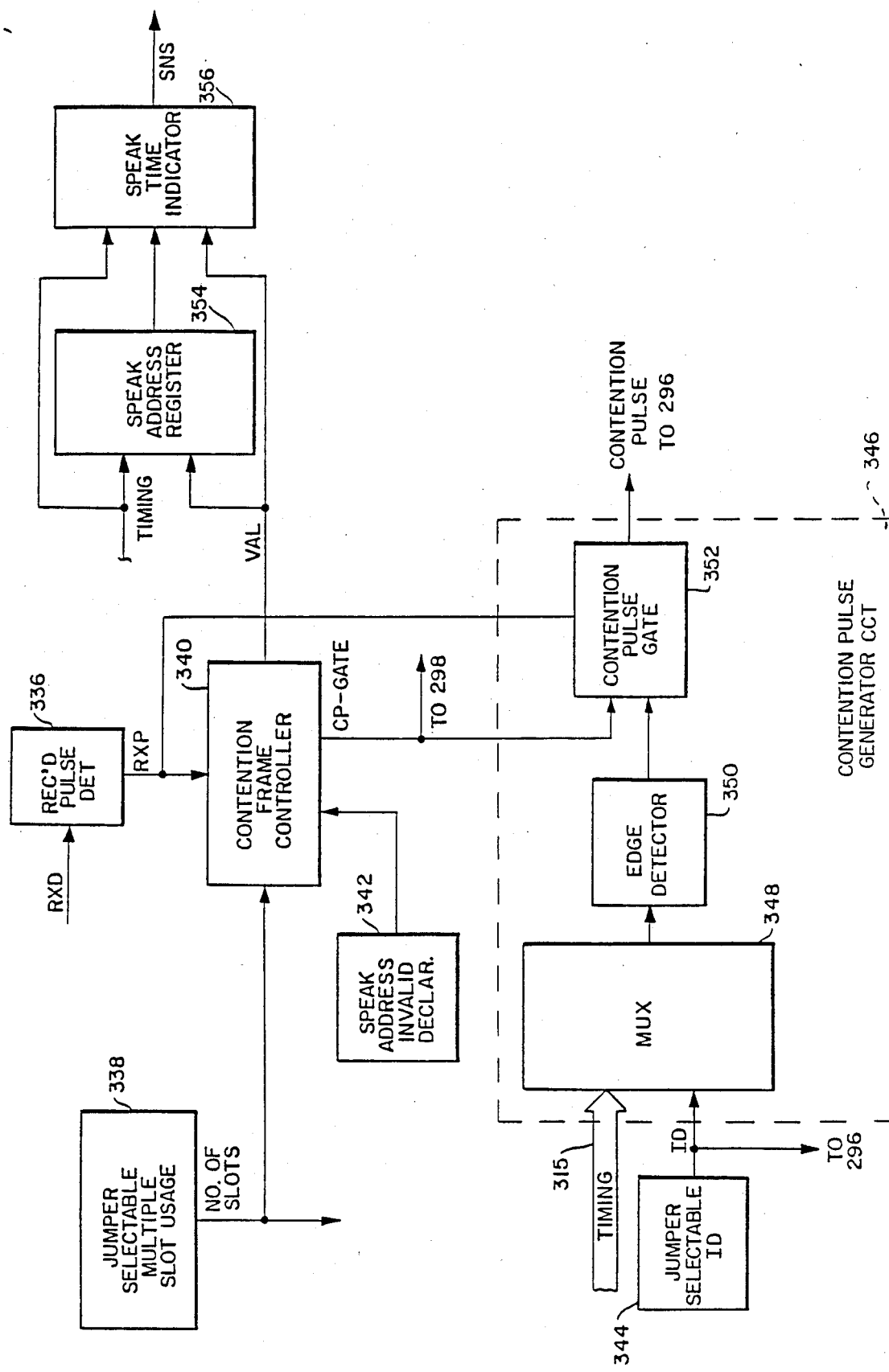
FIG. 17A is a block diagram of the transmission slot controller circuit 294 of FIG. 13.

FIG. 17A is a block diagram of the transmission slot controller circuit 294 of FIG. 13. A received pulse detector 336 receives the received data signal RXD from the receive data decoder 284 (FIG. 13) and generates a received pulse signal RXP for each time slot in which a contention pulse is received.

A jumper selectable multiple slot usage controller circuit 338 indicates the number of slots which the particular sensing station 20 should attempt to claim during the contention frame by generating a number of slots signal.

Figure 17B:
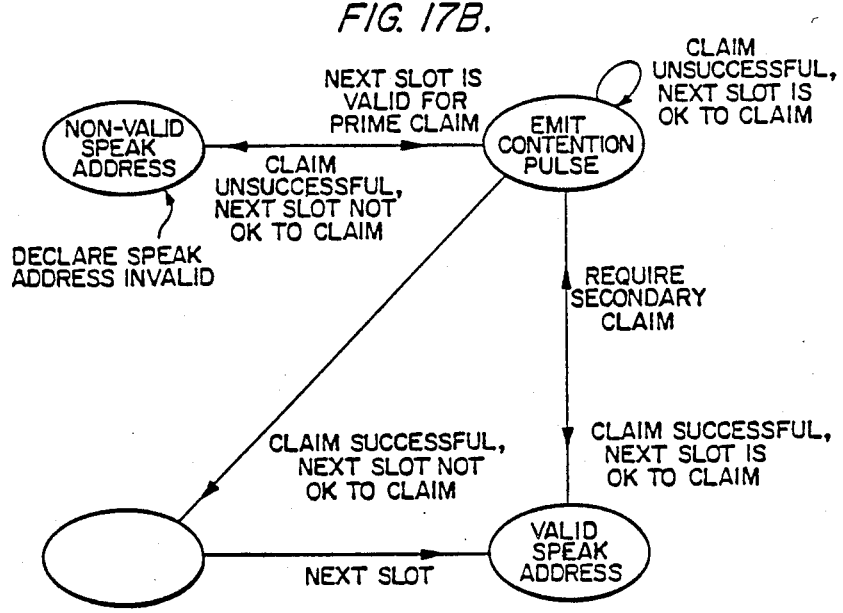
FIG. 17B is a state map for the contention frame controller circuit 340 of FIG. 17A.

A contention frame controller circuit 340 which is a state sequence machine having 4 states, changes on slot boundaries during the contention frame. FIG. 17B is a state map for the contention frame controller circuit 340. During the contention frame, the contention frame controller circuit 340 generates the CP-GATE signal if the booster subsystem 40 should send a contention pulse during a slot. If the booster subsystem 40 is successful in acquiring a required slot or slots for transmission, the contention frame controller circuit 340 ends up in a predetermined state that indicates that a transmission slot has been claimed and generates a valid signal VAL. Thus, the contention frame controller circuit 340 forms a speak address status register which indicates whether the speak address register 354 is valid.

A speak address invalid declarator 342 resets the contention frame controller circuit 340 under certain conditions to its initial state (FIG. 17B) which is the starting point for the contention frame process. The initial state indicates that the booster subsystem 40 has not claimed a transmission slot and no valid signal VAL is generated.

A jumper selectable ID circuit 344 provides a four bit signal which indicates the ID of the booster controller circuit 52 and controls the time within the slot during which the contention pulses are to be generated.

A contention pulse generator circuit 346 generates the contention pulses which are transmitted to the injector circuit 50 through the data handler circuit 296 (FIG. 13). The contention pulse generator circuit 346 includes a 9 to 1 multiplexer circuit 348 which receives timing signals from the booster controller master timing circuit 288 and receives the ID signal from the jumper selectable ID circuit 344. The multiplexer 348 selects one of nine differently phased clock signals from the timing bus 315 and generates a selectable phase slot rate clock signal as an output. An edge detector circuit 350 detects an edge on the output of the multiplexer 348 and generates a pulse which is used as the contention pulse. A contention pulse gate 352 passes the pulse from the edge detector 350 as the contention pulse when the gate signal CP-GATE is generated by the contention frame controller circuit 340, and when no received pulse is detected by the received pulse detector 336.

Once a transmission slot has been claimed by the booster subsystem 40, the address of the transmission slot is stored in a speak address register 354 which comprises a 9 bit register. The speak address register 354 is strobed for each slot in the contention frame under the control of the contention frame controller circuit 340 until a transmission slot is claimed.

A speak time indicator 356 is a 9 bit equality detector which compares two 9 bit words and generates a speak next slot signal SNS when the two 9 bit words are equal. One of the 9 bit words is a next slot number which is part of the timing signals generated by the booster controller master timing circuit 288 and the other is provided by the address stored in the speak address register 354. The speak time indicator 356 inhibits generating signal SNS when the contention frame controller 340 is not generating the VAL signal.

Figure 18:
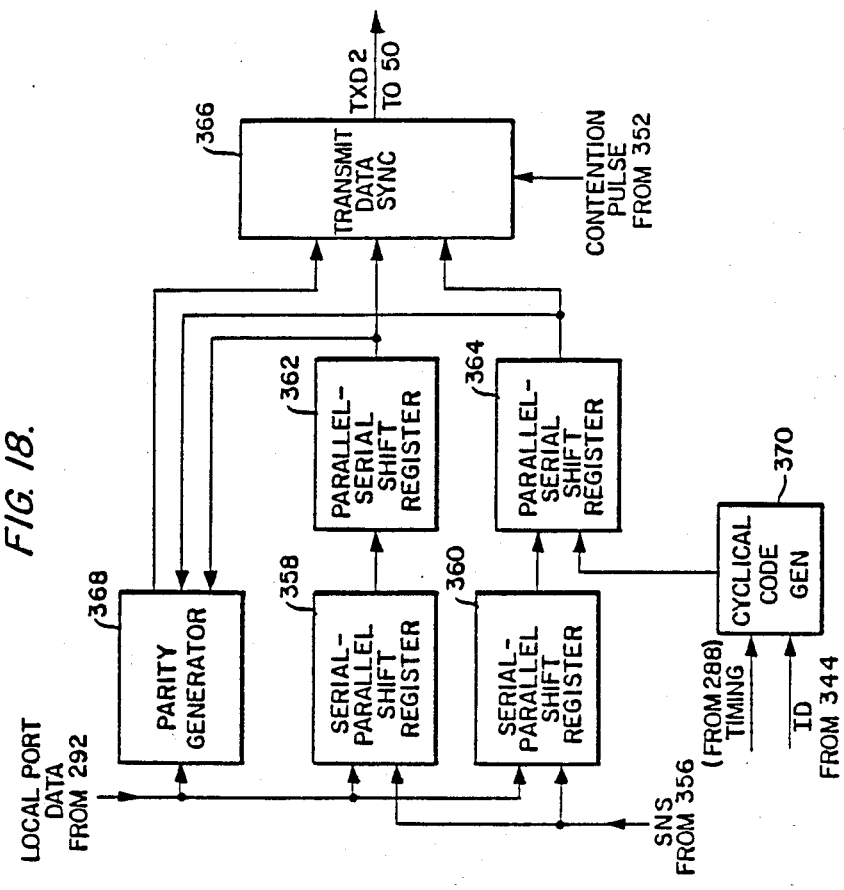
FIG. 18 is a block diagram of the data handler circuit 296 of FIG. 13.

FIG. 18 is a block diagram of the data handler circuit 296 of FIG. 13 and includes a pair of serial-parallel shift registers 358 and 360 and a pair of parallel-serial shift registers 362 and 364. The serial-parallel shift registers 358 and 360 receive serial data from the two local ports via the local port interface circuit 292. The parallel-serial shift registers 362 and 364 periodically strobe data from the serial-parallel shift registers 358 and 360, respectively, and shift the data out serially to a transmit data synchronizer circuit 366. A parity generator 368 generates a parity bit by performing an EXCLUSIVE OR operation on the serial data bit outputs of the parallel-serial shift registers 362 and 364. For example, the second bit is EXCLUSIVE OR'd with the first bit to obtain a first result, the third bit is EXCLUSIVE OR'd with the first result to obtain a second result ..., and so on, until a parity bit is generated and input to the transmit data synchronizer and buffer circuit 366.

A cylical code generator 370 receives the ID signal from the jumper selectable ID circuit 344 and generates a coded ID bit which is merged with the output data by the parallel-serial shift register 364. The ID code bit changes on a frame to frame basis, and over a sequence of 6 frames the sequence of bits uniquely identifies the ID (1 of 9) of the sensing station 20. Thus, the coded sequence of 6 bits is used by the receiver/controller 28 to determine the IDs of each of the sensing stations 20 in the array. The cyclical code generator 370 comprises a multiplexer and some combinatorial logic circuits. The multiplexer selects one of six combinatorial functions of the ID inputs from the jumper selectable ID circuit 344 in accordance with the frame number in the superframe, as conveyed by timing signals from the booster controller master timing circuit 288. There are six frames per superframe. Thus, there are 64 possible codes which can be conveyed with the 6 bit sequence. However, in the present embodiment only 9 of these codes are used, and they are designed so that they can be decoded correctly even if the 6 bit sequence is shifted cyclically.

The transmit data synchronizer circuit 366 merges the local port data, the parity bit, the ID code bit and the contention pulses to generate the transmit data signal TXD2 which is input to the injector circuit 50.

FIG. 19 is a block diagram of the watchdog circuit 298 of FIG. 13. The transmit gate generator 372 generates a transmit gate signal TX GATE which is high for an 18 bit period plus a fraction of a bit on each end. Thus, TX GATE is high for 19 bits and is centered on the 18 bit region on a slot where activity is allowed. There are always two bits in a slot that are termed guard band bits in which there should be no activity. The time period of the transmit gate signal TX GATE should coincide with any activity on the transmit data signal TXD1 since the TX GATE signal is on for one half bit before and after the 18 bit period. The transmit gate signal TX GATE is generated as a function of (1) the speak-next-slot signal SNS generated by the speak time indicator circuit 356 which indicates that data should be transmitted in the next slot and (2) a contention gate signal CP-GATE which indicates that a contention pulse is to be generated. Normally, the TX GATE signal is generated in response to either of the above signals. The transmit gate generator 372 is also connected to the self test circuit 300 which provides an input to cause the TX GATE signal to go low or high abnormally, and ultimately to cause the watchdog circuit 298 to generate an output disable signal.

A violation detector 374 receives the TX GATE signal as well as the transmission data signal TXD1 from the booster controller 52, the mode signal from the mode detector 290, and the received data signal RXD from the receive data decoder 284 (FIG. 13). During the data mode, the violation detector 374 compares the TX GATE signal with the transmit data signal TXD1 and if there is a violation, a violation signal is generated. A violation occurs when either the transmit data signal TXD1 is inactive for an entire time slot when it should be active, or when the transmit data signal TXD1 is active in a slot where it should not be active. During the contention frame mode, the violation detector also considers the received data signal RXD as an input to compensate for the fact that during the contention frame, the contention pulse is sometimes omitted to avoid pulse pile up, thereby resulting in a lack of activity on the transmit data signal TXD1. During the data mode, there is no reason to expect that TXD1 should be inactive for an entire 18 bits during the claimed data transmission slot. This is because the parity generator 368 (FIG. 18) imposes odd parity so that the number of active bits is always odd. Therefore, there must always be at least one active bit on transmit data signal TXD1 in any slot where data transmission is called for.

A temporary inhibit controller circuit 376 includes a bit counter which counts down from the superframe timing signal, so that a single violation results in a temporary inhibit signal which lasts for approximately 3000 frames. Normally, this is enough time for any minor problems in the system to be resolved and for normal operation to resume. However, if the malfunction is more serious, a permanent inhibit controller circuit 378 detects repeated violations and when three violations spread over a substantial time frame have been detected, a latch is set which generates a permanent inhibit signal. The permanent inhibit latch is immediately set by any violation detected in a contention frame. An OR gate 380 ORs the temporary inhibit signal and the permanent inhibit signal to generate the output disable signal.

FIG. 20 is a block diagram of the soft sync circuit 302 of FIG. 13. The soft sync circuit 302 includes inverters 382, 384 and 386, and transmission gates 388, 390 and 392. In general, the generation of the soft sync signal is a function of the received data signal RXD and involves inverting and delaying the received data signal RXD. The transmission gate 388 is employed to create a short term memory of RXD as its output, and the transmission gates 390 and 392 are opened and closed to transmit a true or inverted value of this signal. That is, at the output of the transmission gate 388 there is some small capacitance to ground which is inherent in the input of the inverter 384 which it drives. When the transmission gate 388 opens, the voltage at its output remains at its previous logic level for a brief period of time. The transmission gate 388 is regularly closed once per bit and opened once per bit, thus the storage in the output capacitance is held for a fraction of one bit. When the transmission gate 388 is opened, it is opened near the middle of the bit time so that the value stored at the output of the transmission gate 388 represents the data value on the transmission line 22 in that bit period. That data value is inverted by the inverter 384 and transmitted through inverter 386 and through transmission gate 390 or transmission gate 392. Thus, the transmission gates 390 and 392 select either an inverted or noninverted version of the stored data bit. Just prior to a bit boundary, the switch 390 is closed, the switch 392 is simultaneously opened and the soft sync signal changes state at the bit boundary. When the transmission gate 392 opens and the transmission gate 390 closes, the soft sync signal changes from the inverted value of the stored data bit to the true value of the stored data bit.

The transmission gates 388, 390 and 392 are opened and closed by a timing generator 398 in response to an enable signal from a soft sync enable circuit 400 and in response to the timing signals provided by the booster controller master timing circuit 288. The timing signals employed by the timing generators 398 are those output by the divider circuit 314, have 6 different phases, and are at half the bit rate. Thus, the soft sync signal is provided to the booster circuit 60 as either a rising or a falling logic transition which is synchronized to the timing signals generated by the booster controller master timing circuit 288.

The soft sync enable circuit 400 is used to disable the soft sync circuit 302 by holding the transmission gates 390 and 392 open to allow a sync pulse trailing edge to transmit through the system without the soft sync signal acting on it. When a sync pulse is being passed through the system, the soft sync signal is disabled (i.e transmission gates 390 and 392 are both opened) and the soft sync signal floats to a half way level which is governed by resistors 394 and 396. The soft sync enable circuit 400 also receives the INLOCK signal from the booster controller master timing circuit 288 and if the system is not in phaselock, the soft sync enable circuit 400 disables the soft sync circuit 302.

Figure 21:
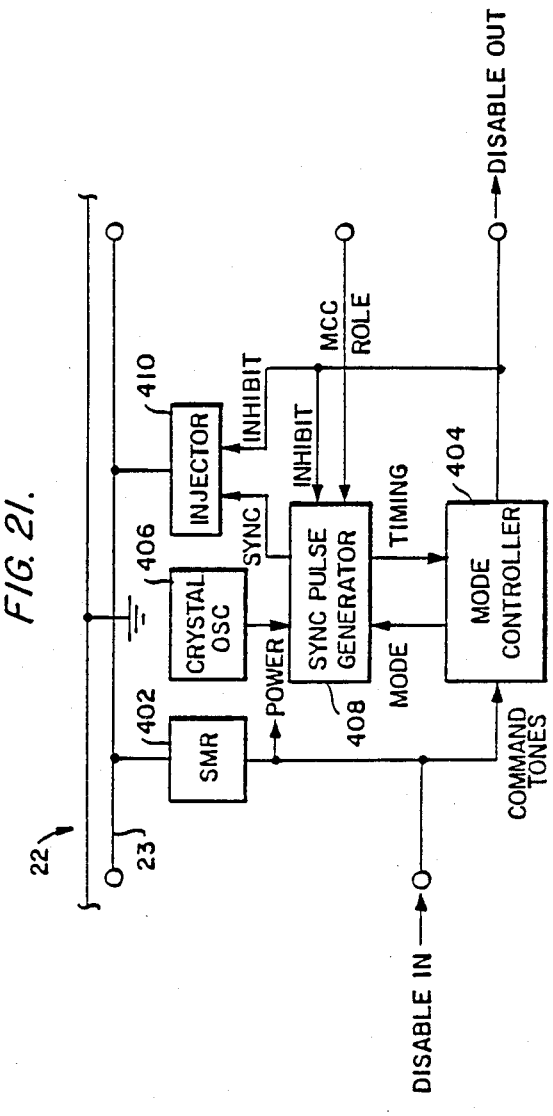
FIG. 21 is a block diagram of the primary master clock 24 illustrated in FIG. 1.

FIG. 21 is a block diagram of the primary master clock 24 of FIG. 1. It should be noted that the construction of the backup master clock 26 is the same as the primary master clock 24 except for minor differences in the external connection of the disable input and output. A switching mode regulator circuit 402 which is the same as the switching mode regulator circuit 56 illustrated in FIGS. 10 and 11, couples power off the center conductor 23 of the transmission line 22 and converts it to supply voltages for use within the primary master clock 24. The switching mode regulator circuit 402 also provides the command tones which are transmitted on the transmission line 22 by the system power and control subsystem 27 to a mode controller circuit 404. A crystal oscillator 406 furnishes a frequency related to the bit rate to a sync pulse generator 408. Thus, the crystal oscillator 406 is used to establish the system bit rate.

The sync pulse generator 408 generates sync pulses unless it is inhibited by an inhibit input, and the pattern of sync pulses generated by the sync pulse generator 408 is the pattern of 8 sync pulses described above with respect to FIG. 14 of the drawings. In the preferred embodiment, the sync pulse generator 408 is implemented by counters which count the number of bits in a slot and the number of slots in a frame. Thus, the sync pulse generator 408 sets up the frame timing for the booster telemetry system of the present invention. As further noted above, the length of some of the sync pulses in the frame can be modulated in dependence upon the MODE signals from the mode controller circuit 404 to indicate to the sensing stations 20 that the contention frame is approaching or that calibration is to take place, or to indicate various other mode functions to the sensing stations 20.

Figure 23:
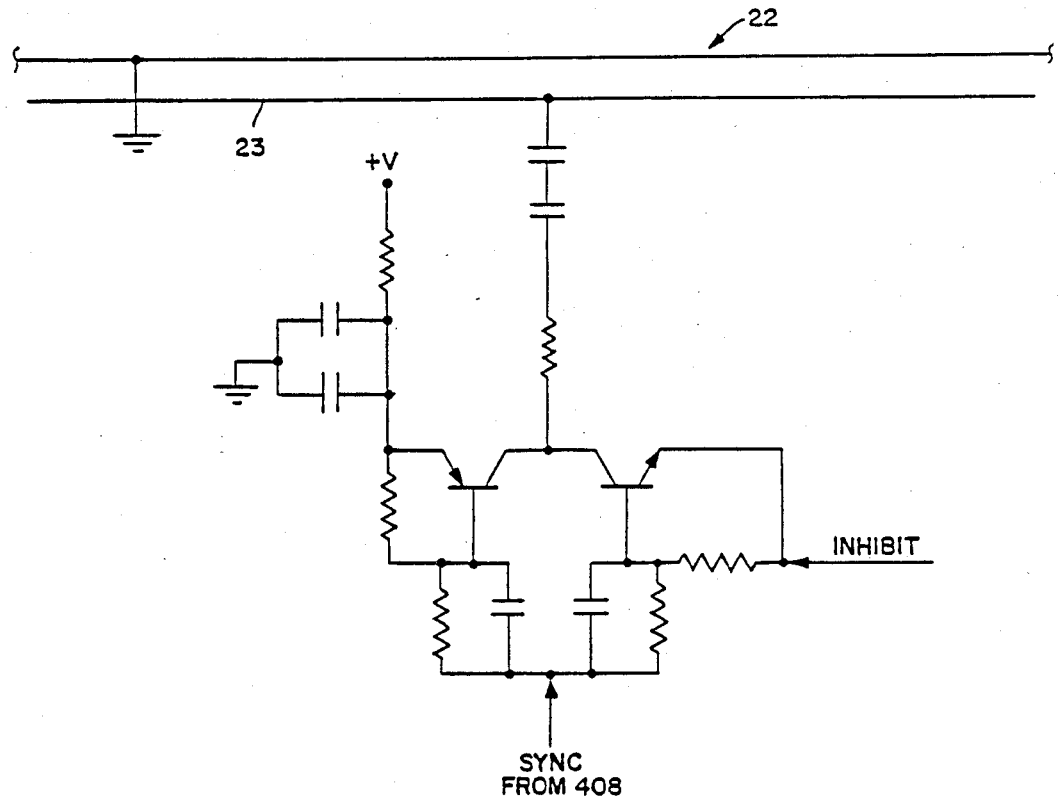
FIG. 23 is a circuit diagram of an embodiment of the injector circuit 410 of FIG. 21.

The mode controller circuit 404 provides a mode signal MODE to the sync pulse generator 408 in dependence upon the command tones provided through the switching mode regulator circuit 402 and in dependence upon power up of the system. In particular, when the power is turned on, the system enters the idle mode. The mode controller circuit 404 generates a calibration mode signal as a function of the command tones which are received through the switching mode regulator circuit 402. A fixed time after the power is turned on, the system enters the data mode and this is the normal operating state of the system. Thus, the mode controller circuit 404 controls the sync pulse generator so that it operates to produce the sync pulses in a normal matter, and the sync pulses are provided to an injector circuit 410 which injects the sync pulses onto the transmission line 22. The injector circuit 410 may be of the same construction as the injector circuit 50 illustrated in FIG. 12 of the drawings. Alternatively, a non-directional injector circuit as illustrated in FIG. 23 may be employed as the injector circuit 410. The mode controller circuit 404 in the backup master clock 26 also responds to the long command tone which indicates switching of the system to the backup master clock 26 by enabling the sync pulse generator 408 and the injector 410 in the backup master clock 26 and by providing a disable input to the primary master clock 24, thereby switching the system to the backup master clock 26.

In the preferred embodiment, the sync pulse generator 408 and the mode controller circuit 404 are implemented as a single integrated circuit. FIG. 22 is a block diagram of the preferred embodiment of the integrated circuit including the pulse generator 408 and mode controller circuit 404.

The mode controller circuit 404 includes a flip-flop 428 which determines whether the system is in the INIT (idle) mode or the RUN (data) mode. A power on reset circuit 426 resets the flip-flop 428 to an INIT state and resets the INIT mode timer/command length timer 416. The INIT mode timer/command length timer 416 counts frames during the INIT mode and counts command tone burst cycles during RUN mode. During the idle mode, a clock input at the frame rate is received by the INIT mode timer/command length timer 416 from a frame divider 430 in the sync pulse generator circuit 408. The frame rate signal advances the counter one count per frame until the terminal count is reached, at which point the flip-flop 428 is set to the RUN state. In the preferred embodiment, this will take 2048 frames. After the RUN state has been achieved, the operation of a command tone envelope detector 414 and corresponding circuitry for detecting the command tones comes into play.

The mode controller circuit 404 further includes a bandpass filter/comparator 412 which is connected to receive the command tones via the switching mode regulator circuit 402. The command tone envelope detector 414 receives the filtered signal from the bandpass filter/comparator 412 and generates a high level output as long as the command tone persists. The INIT mode timer/command length timer 416 counts the tone in terms of cycles until the command tone stops. When a command tone begins, there is an onset during which the command tone envelope detector 414 has not yet responded and an onset detector 418 causes the INIT mode timer/command length timer 416 to be reset. The INIT mode timer/command length counter 416 is then ready to count once the output of the command tone envelope detector 414 goes high. When the command tone ends, the value from the INIT mode timer/command length timer 416 is sent to a command decoder 420 which provides a length signal in dependence upon the command tone length. A command latch circuit 422 includes latches A and B which change state in response to the length signal provided by the command decoder 420. Thus, if the command tone length is in a particular window, the length signal will cause latch A to change state, while if the command tone length is in a different window, the length signal will cause latch B to change state; if it is outside both of the designated windows, neither latch will change state. Latch A supplies the signal CAL which is an output to the sync pulse generator 408 designating that the controller/receiver 28 has called for a calibration operation, while latch B is connected to an active pulldown 424. In the case of the primary master clock 24, when latch B changes state nothing happens because the output of the active pulldown 424 is externally wired to ground. However, in the case of the backup master clock 26, the active pulldown 424 is wired to the primary master clock 24 and the result is a short circuit on the power supply of the primary master clock 24, forcefully disabling the primary master clock 24, and disinhibiting the injector circuit 410 and the sync pulse generator 408 in the backup master clock 26, enabling the backup master clock 26 to begin operation. The power on reset circuit 426 resets both of the comman latches in command latch circuit 422 to zero upon when power is turned on.

The sync pulse generator 408 includes an oscillator 432 which generates a stable frequency. A jumper selectable prescaler 434 divides the stable frequency by a selected power of two to generate a clock signal which is provided to a subframe divider circuit 436. The subframe divider circuit 436 divides the output of the jumper selectable prescaler 434 by a multiple of the modulus so that one sync pulse may be generated per subframe, that is every time the subframe divider circuit 436 cycles through its count. In practice, a sync pulse leading edge is generated at a variable time and always ends at the terminal count of the subframe divider circuit 436, so that the end of the sync pulse is regular in time, from sync pulse to sync pulse. The frame divider circuit 430 divides the output of the subframe divider circuit 436 by 8 to obtain a three bit word that indicates which subframe the system is in. This three bit word is provided to a pulse length controller circuit 438 comprising a multiplexer which scans across its 8 inputs at the rate of one input per subframe under the control of the frame divider circuit 430. Each of seven inputs to the multiplexer in the pulse length controller circuit 438 corresponds to an individual sync pulse in the frame and controls the length of the corresponding sync pulse in the frame. The length of the eighth sync pulse is fixed to provide a fixed length frame sync pulse. A superframe divider circuit 440 advances one count per frame and is a variable modulus divider. The superframe divider 440 can be selectively set to cycle through n frames, where n is an integer from 2 to 8. At its terminal count, the superframe divider 440 generates a signal which is input to the pulse length controller circuit 438 to be used to generate signal K in the booster subsystem 40. If signal K is not to be used, the superframe divider 440 can be disabled.

As noted above, the pulse length controller 438 has 7 inputs which control the length of the 7 sync pulses in a frame. The correspondence between the multiplexer inputs/sync pulses, the elements of the sync pulse generator circuit 408 and the mode controller circuit 404 and the information conveyed by the pulse, are set forth below:

| Multiplexer Input No./ Sync Pulse No. | Connected Element - Information |
| --- | --- |
| 1 | Flip-flop 428 - Idle Mode |
| 2 | Command Latch Circuit 422 - CAL mode |
| 3 | Superframe divider 440 - Signal K - Custom mode |
| 4 | Input X on Sync Pulse Generator 408 - Used for Controlling Self Test |
| 5 | Input Y on Sync Pulse Generator 408 - Purpose Open |
| 6 | Counter input to INIT mode timer/command length counter 46 - used for performance monitoring by controller/receiver 28 of band pass filter/comparator 412 |
| 7 | ROLE - distinguishes the backup vs. the primary master clock to the controller/receiver 28 |

A controllable length pulse generator 442 comprises combinatorial logic to generate three sync pulse leading edge positions, with its inputs connected to the subframe divider circuit 436, and the outputs of the pulse length controller circuit 438. A final synchronizer circuit 444 comprises a first flip-flop which is cleared at the terminal count time of the subframe divider 436 and which is set by the output of the controllable length pulse generator 442. The final synchronizer circuit 444 generates the sync pulses which are injected on the transmission line 22 by the injector circuit 410.

The operation of the system will be described with reference to FIGS. 1, 2, 7, 13, 17A, 21 and 22. After the sensor array has been arranged in the desired position, the system power and control subsystem 27 (FIG. 1) will turn the system power on and the process of initializing the system begins. When power is turned on, the power on reset 426 (FIG. 22) will reset the INIT mode timer/command length timer 416, the flip-flop 428 will be reset to it's INIT state and the system will enter idle mode until the timer 416 reaches it's terminal count. The sync pulse generator 408, upon power up, begins to generate 8 sync pulses per frame, by employing the jumper selectable prescaler 434, the subframe divider 436, the frame divider 430, the pulse length controller 438, the controllable length pulse generator 442 and the final synchronizer 444.

When the pulse length controller 438 receives the INIT signal at one of its inputs, it transmits a signal to the controllable length pulse generator 442 so that sync pulse 1 (FIG. 14) (the first sync pulse in the frame) is modulated to indicate to all of the sensing stations 20 (FIG. 1) that the system is in the idle mode. As noted above, the INIT mode timer/command length timer 416 (FIG. 22) is reset to zero by the power on reset 426 and begins to count upward until it reaches approximately 2048 frames. When the full count is reached, the INIT mode timer/command length timer 416 resets the flip-flop 428 and sends a signal to the pulse length controller 438 to indicate that the system is entering the data mode. The pulse length controller 438 controls the length of sync pulse 1 to indicate to the sensing stations 20, that the system is in the data mode and that the contention frame is approaching. Other inputs to the pulse length controller 438 are directed to the response to command tones being sent by the system power and control subsystem 27 (FIG. 1). These command tones are detected in the mode controller circuit 404 (FIG. 21) which generates the appropriate inputs (e.g. CAL to the pulse length controller 438) to indicate, for example, that the system is to enter a calibration mode. Assuming the primary master clock 24 (FIG. 1) is the master clock selected for operation, the primary master clock 24 will receive a command tone through its switching mode regulator circuit 402 (FIG. 21). The mode controller circuit 404 receives the command tone from the switching mode regulator 402 and detects the onset of the command tone through its onset detector 418 (FIG. 22).

When the system enters the data mode sync pulse 1 is modulated in length, and the next frame sync pulse (sync pulse 8) which is received by the sensing stations 20, indicates that the contention frame is beginning, thereby causing the booster controller circuits 52 and 54 to attempt to claim a slot or slots for data tramsmission (FIG. 2). It should be noted that during the idle mode, and during all subsequent normal operation, the sync pulses are received by the booster subsystem 40 through the booster circuit 60 and are transmitted to the booster controller circuits 52 and 54 as a received data signal IRXD. The booster controller master timing circuit 288 (FIG. 13) generates the timing signals for operation of the booster controller circuit 52 on the basis of the decoded IRXD signal which is the received data signal RXD. The mode detector circuit 290 detects the mode on the basis of the length of the sync pulses and generates a mode signal indicating the mode in which the system is operating. When the system enters the data mode and the contention frame occurs, the transmission slot controller circuit 294 generates contention pulses by its contention pulse generator 346 (FIG. 17A) in dependence upon the slot timing determined by the booster controller master timing circuit 288 (FIG. 13). The transmission slot controller circuit 294 generates contention pulses until it generates a contention pulse in a slot during which no contention pulse has been received on the received data signal RXD. When this occurs, the transmission slot controller circuit 294 claims this slot and the contention frame controller circuit 340 causes the address of this slot to be stored in the speak address register 354. If the system is operating properly, each of the sensing stations 20 will claim a slot for transmission during the contention frame and will store their claimed slot in their speak address register 354.

During and prior to the contention frame, the system has been collecting digital data from the local ports and discarding it. After the contention frame, local digital data received by the booster controller circuit 52 from the local ports is transmitted to the injector circuit 50 in the transmission data signal TXD2 during the claimed time slot for the particular sensing stations 20, for injection onto the transmission line 22 by the injector circuit 50 (FIG. 2). During the operation of the system in the data mode, the primary master clock 24 continues to generate sync pulses in order to maintain the system timing. The sync pulses and the digital data which are injected onto the transmission line 22 are both boosted by the booster circuit 60 located within the booster subsystem 40. The coupling network formed by the transformer 70 and the resistor 72 sense the current in the center conductor 23 of the transmission line 22 (FIG. 7). A second coupling network, formed by the capacitors 74 and 76, and the resistor 78, sense the voltage on the center conductor 23 of the transmission line 22. First and second switching networks are formed by the transistors 80 and 82 and the transistors 86 and 88. The flow of current through each of the transistor switching elements is reversed when an edge is detected by the transmission line 22. When the transistors 80 and 82 switch, the switching causes a voltage to be generated at the upper winding of transformer 70, and when the transistors 86 and 88 switch, there is a coupling from the collector output on the transistor 88, through the capacitor 74 and 76, onto the transmission line 22, thereby providing the flow of current onto the transmission line 22. The combined effects of the voltage and current injected onto the transmission line 22 cause the digital data signal on the line to be boosted. The soft sync signal which is generated by the soft sync circuit 302 (FIG. 13) in the booster controller circuit 52, tends to move the edges of the signal to be boosted in order to maintain proper timing in the system. The soft sync signal is coupled into the base of the transistor 80 without any inversions. Prior to a bit boundary, the logic level of the soft sync signal is opposite the received data signal RXD. This causes the voltage difference between the bases of transistors 80 and 82 to be larger than average, so that the threshold for causing switching of the current flow through these transistors is larger than normal. At the bit boundary, the soft sync signal changes logic levels so that it is the same as the received data signal RXD, thereby reducing the voltage difference between the bases of the transistors 80 and 82, and encouraging switching of the transistors by reducing the threshold. It should be noted that the soft sync signal is disabled for sync pulses so that the system timing can be maintained. Thus, while the sync pulses are boosted by the booster circuit 60, the edges of the sync pulses are not moved in accordance with the soft sync signal.

The system of the present invention may be implemented in numerous ways. For example, the system may be employed in various types of sensing arrays to transmit and boost digital data signals on a transmission line. The system of the present invention may be used in a sea water environment for detecting other vessels and for purposes of exploring for oil in the ocean floor. Further, the telemetry system of the present invention may be employed on land by dispersing the sensing stations 20 at various points and by detecting either natural events (e.g. seismic detection) or looking for oil deposits using sound wave techniques. Further, the booster circuit of the present invention may be implemented by any negative impedance bistable device or circuit and may be employed with any type of electronic transmission line. The booster circuit is suitable for any number of applications in the field of telemetry and more generally, for boosting digital data signals which are transmitted on a transmission line connecting, for example, two or more computers. The booster circuit has industrial and commercial remote control applications and may be used in scientific data gathering systems.

The many features and advantages of the invention are apparent from the detailed specification and thus it is intended by the appended claims to cover all such features and advantages of the system which fall within the true spirit and scope of the invention. Further, since numerous modifications and changes will readily occurred those skilled in the art, it is not desired to limit the invention to the exact construction and operation shown and described and, accordingly, all suitable modifications and equivalents may be resorted to, falling within the scope of the invention.

What is claimed is:

1. A telemetry system, comprising:

an electronic transmission line having a first end;

clock means, operatively connected to said electronic transmission line, for generating a sync signal for transmission on said electronic transmission line;

N receiving means for receiving digital data, where N is an integer greater than or equal to 2;

N booster subsystems coupled to said electronic transmission line between said clock means and the first end of said electronic transmission line, the first booster subsystem being coupled to said electronic transmission line at a position between said clock means and the Nth booster subsystem, the Kth booster subsystem being coupled to said electronic transmission line at a position between said clock means and the (K+1)th booster subsystem (where K is an integer and $1 \leq K < N$), the Kth booster subsystem being operatively connected to the Kth receiving means, said Kth booster subsystem including means for injecting the digital data onto said electronic transmission line, as a digital data signal, in the direction of the first end of said electronic transmission line in dependence upon said sync signal, said Kth booster subsystem further including means for injecting a booster signal onto said electronic transmission line to enhance the amplitude and rise time of the digital data signals injected onto said electronic transmission line by each of said N booster subsystems which is coupled to said electronic transmission line at a position between said clock means and said Kth booster subsystem, said Kth booster subsystem including:

a booster circuit, coupled to said electronic transmission line, for receiving the sync signal and the digital data signals injected onto said electronic transmission line by each of said N booster subsystems which is coupled to said electronic transmission line at a position between said clock means and said Kth booster subsystem, for generating a received data signal, and for injecting the booster signal onto said electronic transmission line to combine with each of the digital data signals travelling on said electronic transmission line, in order to enhance the amplitude and rise time of each of the digital data signals, said booster circuit including:

a first coupling network, coupled to said electronic transmission line, for sensing the current on said electronic transmission line and for generating a first sensing signal; and a second coupling network, coupled to said electronic transmission line, for sensing the voltage on said electronic transmission line and for generating a second sensing signal;

switching means, operatively connected to said first and second coupling networks, for alternately switching between first and second states, so that said booster circuit injects the booster signal onto said electronic transmission line, wherein the booster signal includes a voltage signal injected onto said electronic transmission line through said first coupling network and a current signal injected onto said electronic transmission line through said second coupling network; and booster controller means, operatively connected to said booster circuit, said Kth receiving means, and said electronic transmission line, for receiving the digital data from said Kth receiving means and the received data signal from said booster circuit, and for generating a transmit data signal to be injected onto said electronic transmission line, by said digital data injecting means of said Kth booster subsystem, as the digital data signal.

2. A telemetry system, comprising:

an electronic transmission line having a first end;

clock means, operatively connected to said electronic transmission line, for generating a sync signal for transmission on said electronic transmission line;

N receiving means for receiving digital data, where N is an integer greater than or equal to 2;

N booster subsystems coupled to said electronic transmission line between said clock means and the first end of said electronic transmission line, the first booster subsystem being coupled to said electronic transmission line at a position between said clock means and the Nth booster subsystem, the Kth booster subsystem being coupled to said electronic transmission line at a position between said clock means and the (K+1)th booster subsystem (where K is an integer and $1 \leq K < N$), the Kth booster subsystem being operatively connected to the Kth receiving means, said Kth booster subsystem including means for injecting the digital data onto said electronic transmission line, as a digital data signal, in the direction of the first end of said electronic transmission line in dependence upon said sync signal, said Kth booster subsystem further including means for injecting a booster signal onto said electronic transmission line to enhance the amplitude and rise time of the digital data signals injected onto said electronic transmission line by each of said N booster subsystems which is coupled to said electronic transmission line at a position between said clock means and said Kth booster subsystem, said Kth booster subsystem including:

a booster circuit, coupled to said electronic transmission line, for receiving the sync signal and the digital data signals injected onto said electronic transmission line by each of said N booster subsystems which is coupled to said electronic transmission line at a position between said clock means and said Kth booster subsystem, for generating a received data signal, and for injecting the booster signal onto said electronic transmission line to combine with each of the digital data signals travelling on said electronic transmission line, in order to enhance the amplitude and rise time of each of the digital data signals, said booster circuit including:

a first coupling network, coupled to said electronic transmission line, for sensing the current on said transmission line and for generating a first sensing signal;

a second coupling network, coupled to said electronic transmission line, for sensing the voltage on said electronic transmission line and for generating a second sensing signal;

first switching means, operatively connected to said first and second coupling networks, for alternately switching between first and second states, wherein, when said first switching means switches, a voltage signal is injected onto said electronic transmission line through said first coupling network; and second switching means, operatively connected to said first switching means and to said second coupling network, for alternately switching between first and second states in dependence upon the switching of said first switching means, wherein, when said second switching means switches, a current signal is injected onto said electronic transmission line through said second coupling network, wherein said booster signal comprises said voltage signal and said current signal, and wherein said first switching means switches in dependence upon said first and second sensing signals and the state of said second switching means; and booster controller means, operatively connected to said booster circuit, said Kth receiving means, and said electronic transmission line, for receiving the digital data from said Kth receiving means and the received data signal from said booster circuit, and for generating a transmit data signal to be injected onto said electronic transmission line, by said digital data injecting means of said Kth booster subsystem, as the digital data signal.

3. A telemetry system as set forth in claim 1 or 2, wherein the sync signal includes a plurality of sync pulses which define a frame, wherein the frame is divided into at least N slots, and wherein said booster controller means comprises means for claiming one of the at least N slots in a frame and for generating the transmit data signal during the claimed slot.

4. A telemetry system as set forth in claim 2, wherein said first and second switching means comprise first and second current switches, respectively.

5. A telemetry system as set forth in claim 4, wherein said first coupling network comprises a transformer coupled to said electronic transmission line and operatively connected to said first current switch, and wherein said second coupling network comprises a capacitance coupled to said electronic transmission line and operatively connected to said first and second current switches.

6. A telemetry system as set forth in claim 1 or 2 further comprising means for providing a supply current on said electronic transmission line, wherein said Kth booster subsystem further comprises:

a switching mode regulator circuit, coupled to said electronic transmission line, for receiving the supply current and for generating local power for the Kth booster subsystem.

7. A telemetry system as set forth in claim 6, wherein said switching mode regulator circuit comprises:

first means, coupled to said electronic transmission line, for receiving the supply current and for generating a power signal comprising a sinusoidal current and a square wave voltage;

a tank circuit, operatively connected to said first means, for generating, as an output, a sinusoidal voltage which is proportional to the sinusoidal current; and second means, operatively connected to said tank circuit, for receiving the sinusoidal voltage and for providing the local power.

8. A telemetry system as set forth in claim 1 or 2 wherein said booster controller means comprises a soft sync generator circuit, operatively connected to said booster circuit, for generating a soft sync signal to adjust the timing of the injection of the booster signal onto said electronic transmission line, thereby maintaining the digital data signals transmitted on said electronic transmission line synchronous.

9. A telemetry system as set forth in claim 8, wherein said Kth booster subsystem further comprises an injector circuit, directionally coupled to said electronic transmission line and operatively connected to said booster controller means, for receiving the transmit data signal from said booster controller means and for injecting the transmit data signal onto said electronic transmission line as the digital data signal.

10. A telemetry system, comprising:

an electronic transmission line having a first end;

clock means, operatively connected to said electronic transmission line, for generating a sync signal for transmission on said electronic transmission line;

first receiving means for receiving first local digital data;

second receiving means for receiving second local digital data;

a first booster subsystem coupled to said electronic transmission line at a position between said clock means and the first end of said electronic transmission line, and operatively connected to said first receiving means, said first booster subsystem including means for injecting the first local digital data, as a first digital data signal, onto said electronic transmission line in a first direction toward the first end of said electronic transmission line, the first digital data signal being injected onto said electronic transmission line in dependence upon said sync signal, said first booster subsystem further including means for injecting a first booster signal onto said electronic transmission line to enhance the amplitude and rise time of the sync signal, said first booster signal injecting means of said first booster subsystem comprising:

a first booster circuit, coupled to said electronic transmission line, for receiving the sync signal, for generating a received data signal and for injecting the first booster signal onto said electronic transmission line to combine with the sync signal travelling on said electronic transmission line, in order to enhance the amplitude and rise time of the sync signal;

first booster controller means, operatively connected to said first booster circuit, said first receiving means and said electronic transmission line, for receiving the first local digital data from said first receiving means and the received data signal from said first booster circuit, and for generating a transmit data signal which is injected onto said electronic transmission line, by said first local digital data injecting means of said first booster subsystem, as the first digital data signal;

a second booster subsystem coupled to said electronic transmission line at a position between said first booster subsystem and the first end of said electronic transmission line, and operatively connected to said second receiving means, said second booster subsystem including means for injecting the second local digital data, as a second digital data signal, onto said electronic transmission line in the first direction, the second digital data signal being injected in dependence upon said sync signal, said second booster subsystem including means for injecting a second booster signal onto said electronic transmission line to enhance the amplitude and rise time of the first digital data signal and the sync signal, said second booster signal injecting means of said second booster subsystem comprising:

a second booster circuit, coupled to said electronic transmission line, for receiving the sync signal and the first digital data signal, for generating a received data signal and for injecting the second booster signal onto said electronic transmission line to combine with the sync signal and the first digital data signal travelling on said electronic transmission line, in order to enhance the amplitude and rise time of the sync signal and the first digital data signal; and second booster controller means, operatively connected to said second booster circuit, said second receiving means, and said electronic transmission line, for receiving the second local digital data from said second receiving means and the received data signal from said second booster circuit and for generating a transmit data signal which is injected onto said electronic transmission line by said second local digital data injecting means of said second booster subsystem as the second digital data signal.

11. A telemetry system as set forth in claim 10, wherein each of said first and second booster circuits comprises:

a first coupling network, coupled to said electronic transmission line, for sensing the current on said electronic transmission line and for generating a first sensing signal;

a second coupling network, coupled to said electronic transmission line, for sensing the voltage on said electronic transmission line and for generating a second sensing signal;

switching means, operatively connected to said first and second coupling networks, for alternately switching between first and second states so that said booster circuit injects the booster signal onto said electronic transmission line, wherein the booster signal includes a voltage signal injected onto said electronic transmission line through said first coupling network and a current signal injected onto said electronic transmission line through said second coupling network.

12. A telemetry system as set forth in claim 10, wherein the sync signal includes a plurality of sync pulses which define a frame, wherein the frame is divided into slots, and wherein each of said first and second booster controller means comprises means for claiming one of the slots in a frame and for generating the transmit data signal during the claimed slot.

13. A telemetry system as set forth in claim 10, wherein each of said first and second booster circuits comprises:
- a first coupling network, coupled to said electronic transmission line, for sensing the current on said electronic transmission line and for generating a first sensing signal;
- a second coupling network, coupled to said electronic transmission line, for sensing the voltage on said electronic transmission line and for generating a second sensing signal;
- first switching means, operatively connected to said first and second coupling networks, for alternately switching between first and second states, wherein, when said first switching means switches, a voltage signal is injected onto said electronic transmission line through said first coupling network;
- second switching means, operatively connected to said first switching means and to said second coupling network, for alternately switching between first and second states in dependence upon the switching of said first switching means, wherein, when said second switching means switches, a current signal is injected onto said electronic transmission line through said second coupling network, wherein said booster signal comprises said voltage signal and said current signal, and wherein said first switching means switches in dependence upon the first and second sensing signals and on the state of said second switching means.

14. A telemetry system as set forth in claim 13, wherein said first and second switching means comprise first and second current switches, respectively.

15. A telemetry system as set forth in claim 14, wherein said first coupling network comprises a transformer coupled to said electronic transmission line and operatively connected to said first current switch, and wherein said second coupling network comprises a capacitance coupled to said electronic transmission line and said first and second current switches.

16. A telemetry system as set forth in claim 10, wherein each of said first and second booster controller means comprises a soft sync generator circuit, operatively connected to a respective one of said first and second booster circuits, for generating a soft sync signal to adjust the timing of the injection of the booster signal onto said electronic transmission line.

17. A telemetry system as set forth in claim 10, wherein each of said first and second booster subsystems further comprises an injector circuit, directionally coupled to said electronic transmission line and operatively connected to said booster controller means, for receiving the transmit data signal from said booster controller means and for injecting the transmit data signal onto said electronic transmission line as the digital data signal.

18. A telemetry system as set forth in claim 17, wherein said first booster controller means comprises:
- a first booster controller circuit, operatively connected to said first booster circuit, and operatively connected to said transmission line, for providing the transmit data signal;
- a second booster controller circuit, operatively connected to said first booster circuit and to said injector circuit, for generating an internal transmit data signal,
- wherein said first booster controller circuit includes a watchdog circuit, connected to said second booster controller circuit, for receiving the internal transmit data signal and for generating an output disable signal for disabling said injector circuit if during a time slot the activity of said transmit data signal and the internal transmit data signal do not coincide; and
- wherein said second booster controller circuit includes a watchdog circuit for receiving the transmit data signal from said first booster controller circuit and for generating an output disable signal for disabling said injector circuit if during a time slot the activity of said transmit data signal and the internal transmit signal do not coincide.

19. A telemetry system as set forth in claim 10, further comprising means for providing a supply current on said electronic transmission line, wherein said first and second booster subsystems each further comprise:
- a switching mode regulator circuit, coupled to said electronic transmission line, for receiving the supply current and for generating local power for the corresponding one of said first and second booster subsystems.

* * * * *